US012604185B2

(12) United States Patent
Elshafie et al.

(10) Patent No.: US 12,604,185 B2
(45) Date of Patent: Apr. 14, 2026

(54) SECURITY KEY DERIVATION USING DECODED INFORMATION BLOCKS

(71) Applicant: QUALCOMM Incorporated, San Diego, CA (US)

(72) Inventors: Ahmed Elshafie, San Diego, CA (US); Alexandros Manolakos, Athens (GR); Hung Dinh Ly, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 2 days.

(21) Appl. No.: 18/714,051

(22) PCT Filed: Dec. 22, 2022

(86) PCT No.: PCT/US2022/082229
§ 371 (c)(1),
(2) Date: May 28, 2024

(87) PCT Pub. No.: WO2023/146718
PCT Pub. Date: Aug. 3, 2023

(65) Prior Publication Data
US 2025/0048090 A1      Feb. 6, 2025

(30) Foreign Application Priority Data
Jan. 27, 2022    (GR) .............................. 20220100077

(51) Int. Cl.
*H04W 12/041* (2021.01)
*H04W 72/23* (2023.01)

(52) U.S. Cl.
CPC ......... *H04W 12/041* (2021.01); *H04W 72/23* (2023.01)

(58) Field of Classification Search
CPC ............................ H04W 12/041; H04W 72/23
See application file for complete search history.

(56) References Cited

U.S. PATENT DOCUMENTS

| | | | |
|---|---|---|---|
| 12,238,783 B2 * | 2/2025 | Narasimha | ........ H04W 72/0446 |
| 2019/0020633 A1 * | 1/2019 | Leavy | ........................ H04L 9/14 |
| 2019/0372705 A1 * | 12/2019 | Van Wyk | .............. H04L 1/0011 |

FOREIGN PATENT DOCUMENTS

| | | |
|---|---|---|
| SG | 10201406293P A | 5/2016 |
| WO | WO-2021088451 A1 | 5/2021 |

OTHER PUBLICATIONS

Bozorgi A., et al., "Challenges in Designing a Distributed Cryptographic File System (Transcript of Discussion)", Aug. 21, 2020, 16th European Conference—Computer Vision—ECCV 2020, Cornell University Library, 201 Olin Library Cornell University Ithaca, NY 14853, XP047559223, pp. 193-199.

(Continued)

*Primary Examiner* — Clayton R Williams
(74) *Attorney, Agent, or Firm* — Holland & Hart LLP

(57) ABSTRACT
Methods, systems, and devices for wireless communications are described. For instance, a first wireless device may receive, from a second wireless device, a first message, the first message including one or more first information blocks encoded based on a first key. The first wireless device may transmit, to the second wireless device, an indication that the one or more first information blocks have been successfully decoded. The first wireless device may communicate, with the second wireless device, a second message, where the second message includes information that is encoded based on a second key that is derived from at least a portion of the decoded one or more first information blocks.

30 Claims, 14 Drawing Sheets

(56)          References Cited

OTHER PUBLICATIONS

"Chapter 7: Block Ciphers ED—Menezes A J, Van Oorschot PC,
Vanstone S A", Handbook of Applied Cryptography, [CRC Press
Series on Discrete Mathematices and its Applications], CRC Press,
Boca Raton, FL, US, Oct. 1, 1996, XP001525007, pp. 223-282,
Section 7.2.2: "Modes of Operation".
International Search Report and Written Opinion—PCT/US2022/
082229—ISA/EPO—May 2, 2023.

* cited by examiner

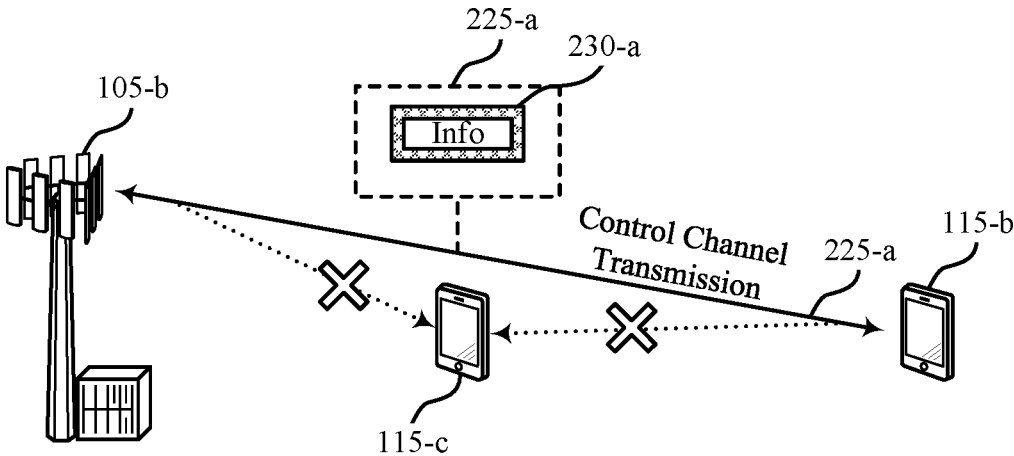
FIG. 3

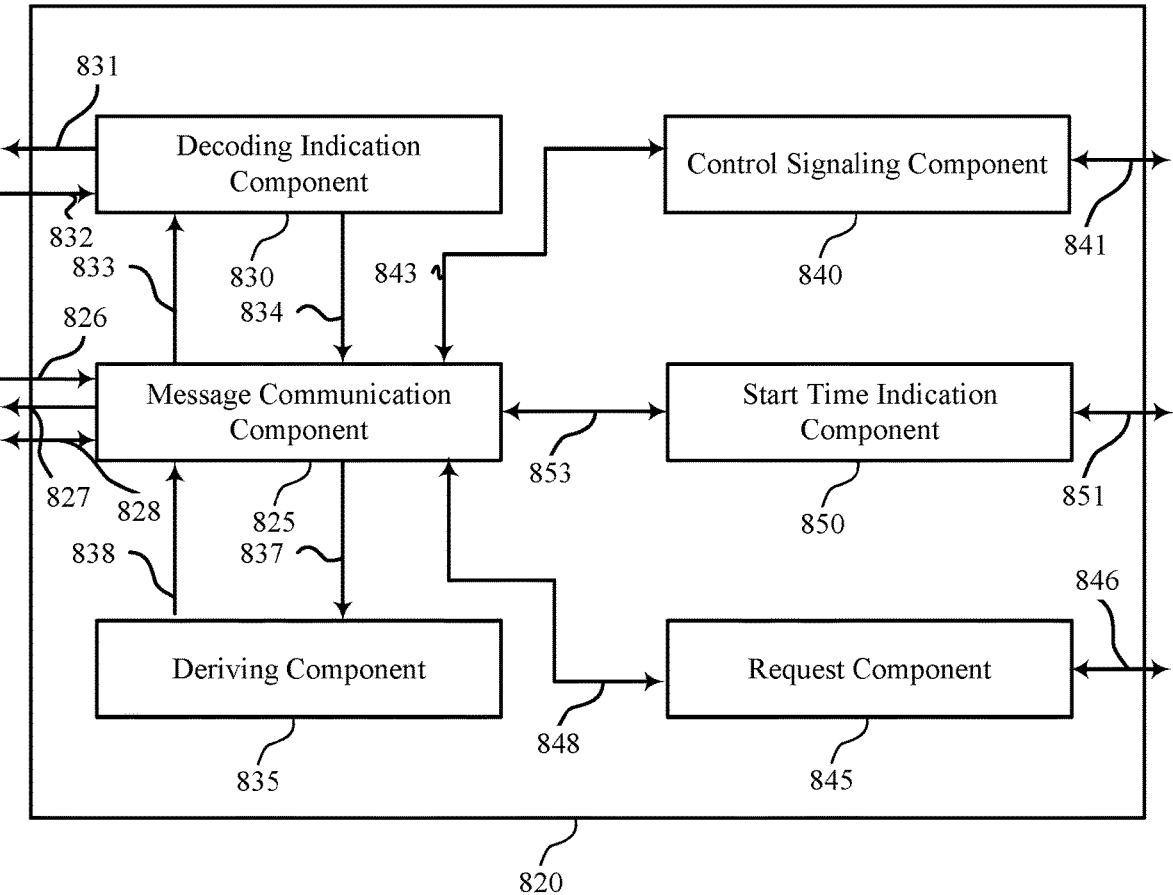
FIG. 8

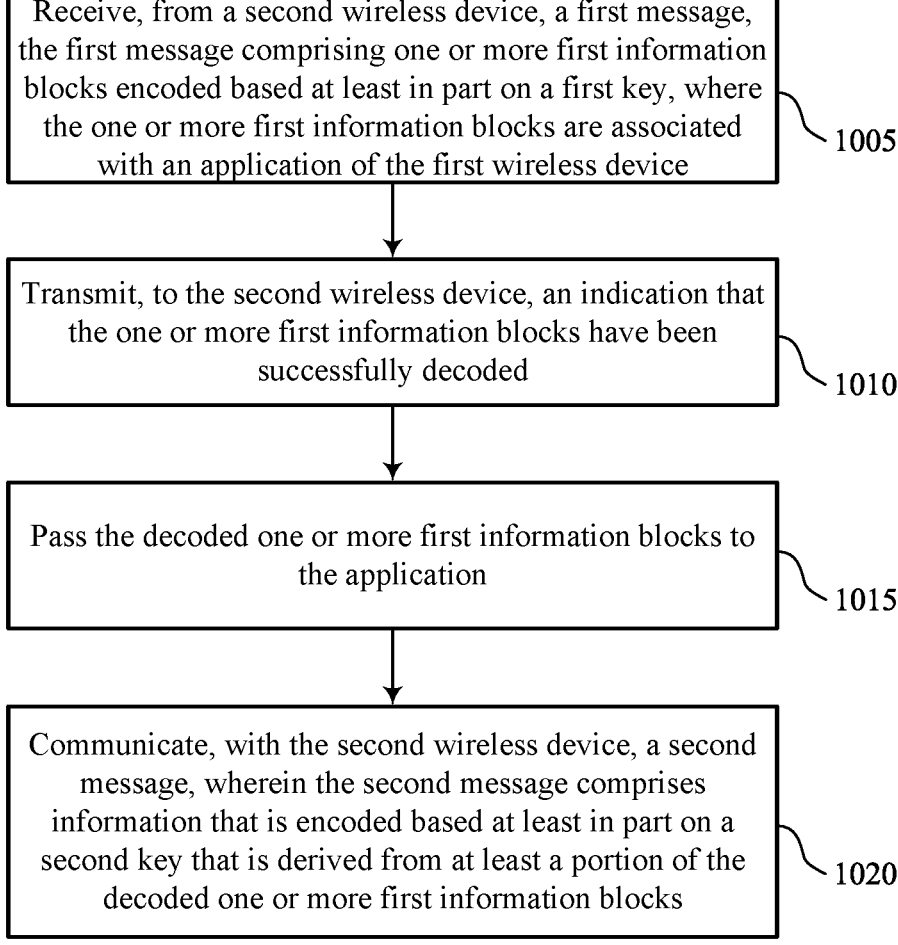

Receive, from a second wireless device, a first message, the first message comprising one or more first information blocks encoded based at least in part on a first key, where the one or more first information blocks are associated with an application of the first wireless device

1005

Transmit, to the second wireless device, an indication that the one or more first information blocks have been successfully decoded

1010

Pass the decoded one or more first information blocks to the application

1015

Communicate, with the second wireless device, a second message, wherein the second message comprises information that is encoded based at least in part on a second key that is derived from at least a portion of the decoded one or more first information blocks

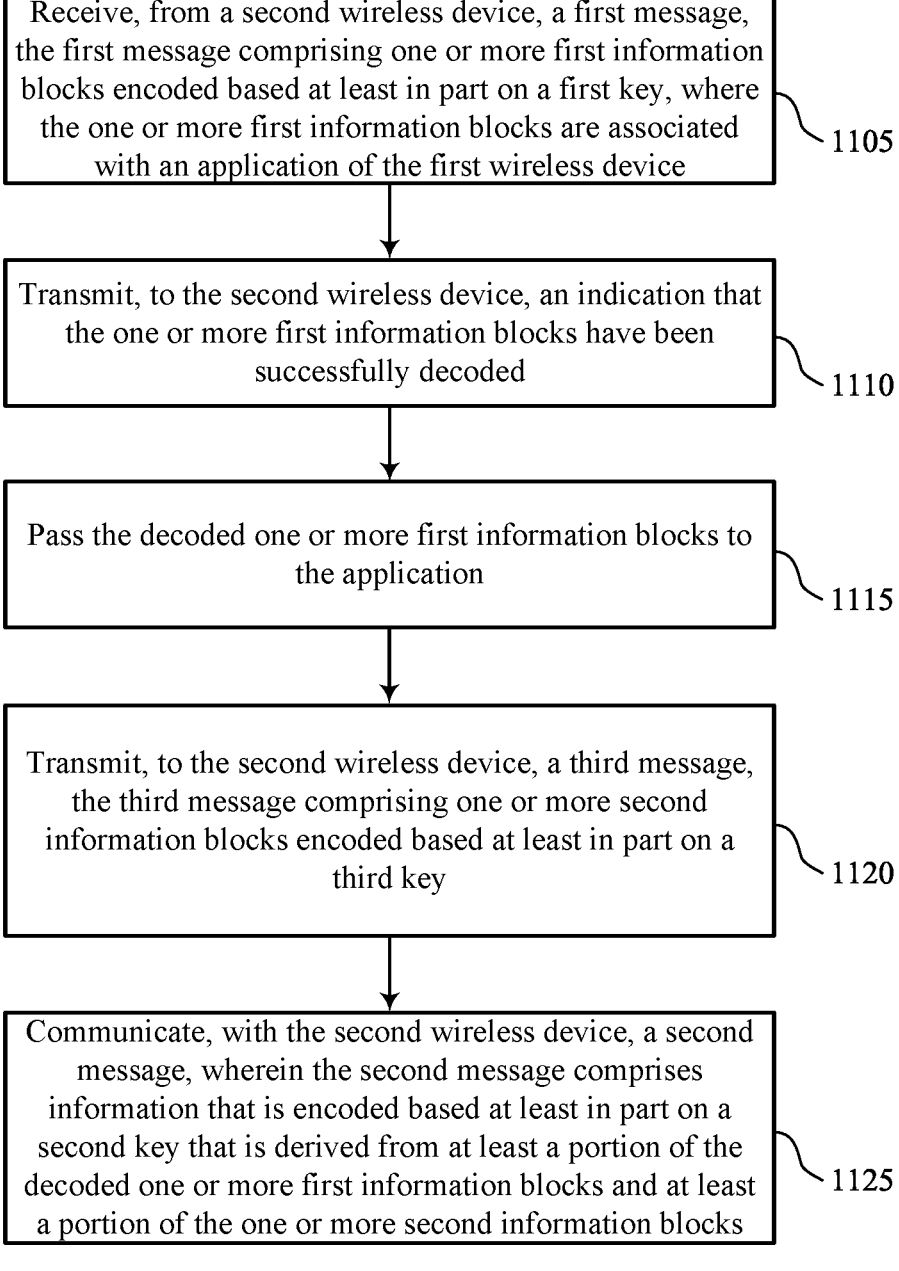

Receive, from a second wireless device, a first message, the first message comprising one or more first information blocks encoded based at least in part on a first key, where the one or more first information blocks are associated with an application of the first wireless device

1105

Transmit, to the second wireless device, an indication that the one or more first information blocks have been successfully decoded

1110

Pass the decoded one or more first information blocks to the application

1115

Transmit, to the second wireless device, a third message, the third message comprising one or more second information blocks encoded based at least in part on a third key

1120

Communicate, with the second wireless device, a second message, wherein the second message comprises information that is encoded based at least in part on a second key that is derived from at least a portion of the decoded one or more first information blocks and at least a portion of the one or more second information blocks

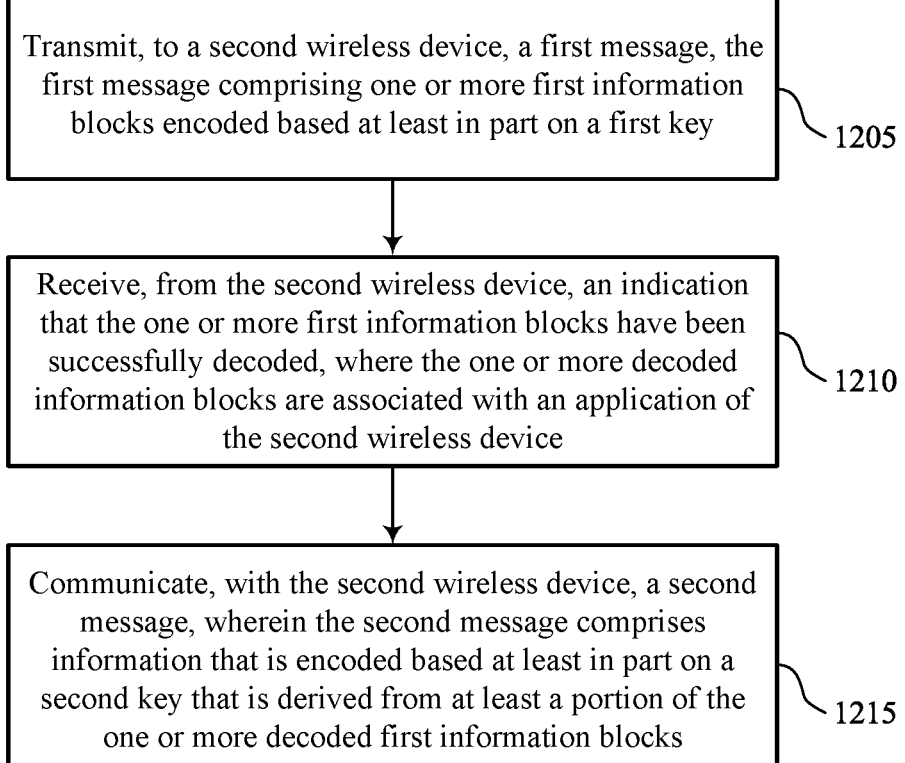

Transmit, to a second wireless device, a first message, the first message comprising one or more first information blocks encoded based at least in part on a first key

1205

Receive, from the second wireless device, an indication that the one or more first information blocks have been successfully decoded, where the one or more decoded information blocks are associated with an application of the second wireless device

1210

Communicate, with the second wireless device, a second message, wherein the second message comprises information that is encoded based at least in part on a second key that is derived from at least a portion of the one or more decoded first information blocks

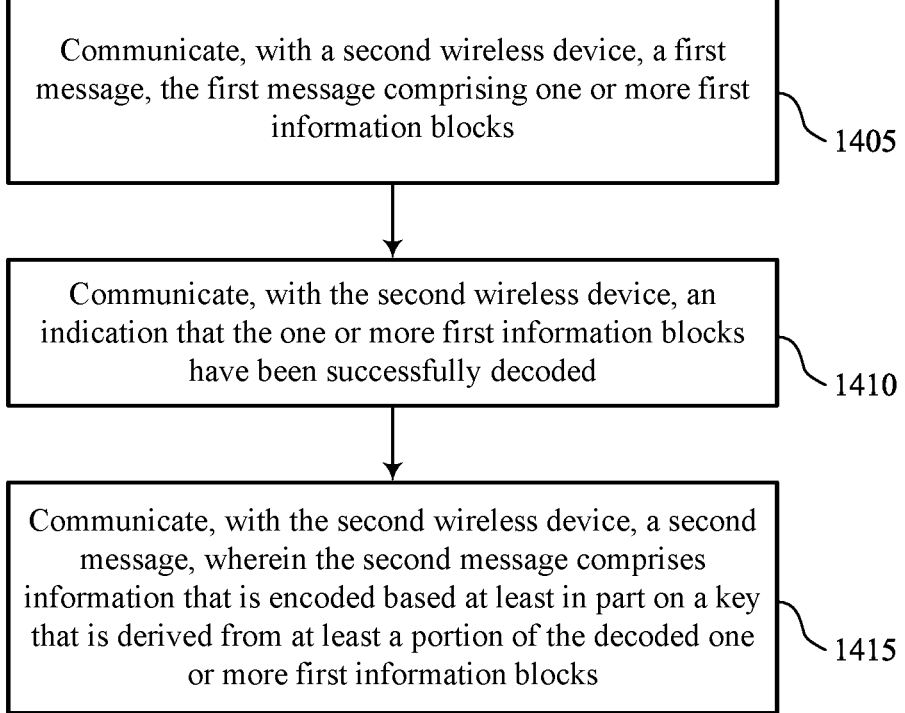

Communicate, with a second wireless device, a first message, the first message comprising one or more first information blocks

1405

Communicate, with the second wireless device, an indication that the one or more first information blocks have been successfully decoded

1410

Communicate, with the second wireless device, a second message, wherein the second message comprises information that is encoded based at least in part on a key that is derived from at least a portion of the decoded one or more first information blocks

SECURITY KEY DERIVATION USING DECODED INFORMATION BLOCKS

CROSS REFERENCE

The present Application is a 371 national stage filing of International PCT Application No. PCT/US2022/082229 by ELSHAFIE et al. entitled "SECURITY KEY DERIVATION USING DECODED INFORMATION BLOCKS," filed Dec. 22, 2022; and claims priority to of Greece Patent Application No. 20220100077 by ELSHAFIE et al., entitled "SECURITY KEY DERIVATION USING DECODED INFORMATION BLOCKS," filed Jan. 27, 2022, each of which is assigned to the assignee hereof, and each of which is expressly incorporated by reference in its entirety herein.

FIELD OF TECHNOLOGY

The following relates to wireless communications, including security key derivation using decoded information blocks.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some examples, a UE may communicate with a base station. If the communications between the UE and the base station are not secured, another device may intercept and decode the communications. Maintaining secure communications in wireless communication systems where the physical medium is available for eavesdropping presents challenges.

SUMMARY

The described techniques relate to improved methods, systems, devices, and apparatuses that support security key derivation using decoded information blocks. Generally, the described techniques provide for wireless devices to communicate a value of a key without generating additional overhead. For instance, a first wireless device may receive, from a second wireless device, a first message, the first message including one or more first information blocks encoded based on a first key, where the one or more first information blocks are associated with an application of the first wireless device. The first wireless device may transmit, to the second wireless device, an indication that the one or more first information blocks have been successfully decoded. The first wireless device may pass the decoded one or more first information blocks to the application. The first wireless device may communicate, with the second wireless device, a second message, where the second message includes information that is encoded based on a second key that is derived from at least a portion of the decoded one or more first information blocks.

A method is described. The method may include receiving, from a second wireless device, a first message, the first message including one or more first information blocks encoded based on a first key, where the one or more first information blocks are associated with an application of the first wireless device, transmitting, to the second wireless device, an indication that the one or more first information blocks have been successfully decoded, passing the decoded one or more first information blocks to the application, and communicating, with the second wireless device, a second message, where the second message includes information that is encoded based on a second key that is derived from at least a portion of the decoded one or more first information blocks.

An apparatus is described. The apparatus may include a processor, memory coupled with the processor, and instructions stored in the memory. The instructions may be executable by the processor to cause the apparatus to receive, from a second wireless device, a first message, the first message including one or more first information blocks encoded based on a first key, where the one or more first information blocks are associated with an application of the first wireless device, transmit, to the second wireless device, an indication that the one or more first information blocks have been successfully decoded, pass the decoded one or more first information blocks to the application, and communicate, with the second wireless device, a second message, where the second message includes information that is encoded based on a second key that is derived from at least a portion of the decoded one or more first information blocks.

Another apparatus is described. The apparatus may include means for receiving, from a second wireless device, a first message, the first message including one or more first information blocks encoded based on a first key, where the one or more first information blocks are associated with an application of the first wireless device, means for transmitting, to the second wireless device, an indication that the one or more first information blocks have been successfully decoded, means for passing the decoded one or more first information blocks to the application, and means for communicating, with the second wireless device, a second message, where the second message includes information that is encoded based on a second key that is derived from at least a portion of the decoded one or more first information blocks.

A non-transitory computer-readable medium storing code is described. The code may include instructions executable by a processor to receive, from a second wireless device, a first message, the first message including one or more first information blocks encoded based on a first key, where the one or more first information blocks are associated with an application of the first wireless device, transmit, to the second wireless device, an indication that the one or more first information blocks have been successfully decoded, pass the decoded one or more first information blocks to the application, and communicate, with the second wireless device, a second message, where the second message includes information that is encoded based on a second key that is derived from at least a portion of the decoded one or more first information blocks.

Some examples of the method, apparatuses, and non-transitory computer-readable medium described herein may further include operations, features, means, or instructions for transmitting, to the second wireless device, a third message, the third message including one or more second information blocks encoded based on a third key, where the third key may be derived from at least a portion of the one or more second information blocks.

Some examples of the method, apparatuses, and non-transitory computer-readable medium described herein may further include operations, features, means, or instructions for communicating, with the second wireless device, control signaling indicating the at least the portion of the decoded one or more first information blocks from which the second key may be derived.

In some examples of the method, apparatuses, and non-transitory computer-readable medium described herein, communicating the control signaling indicating the at least the portion of the decoded one or more first information blocks may include operations, features, means, or instructions for communicating, with the second wireless device, the control signaling indicating a set of patterns for deriving keys from information blocks.

Some examples of the method, apparatuses, and non-transitory computer-readable medium described herein may further include operations, features, means, or instructions for communicating, with the second wireless device, second control signaling indicating to select one of the set of patterns for deriving the second key from the one or more first information blocks, where the control signaling includes radio resource control signaling and the second control signaling includes medium access control (MAC) control element signaling.

Some examples of the method, apparatuses, and non-transitory computer-readable medium described herein may further include operations, features, means, or instructions for communicating, after communicating the first message, radio resource control signaling, medium access control (MAC) control element signaling, downlink control information, or a downlink shared channel transmission including a request to derive the second key from the at least the portion of the decoded one or more first information blocks, where communicating the second message may be based on communicating the request.

In some examples of the method, apparatuses, and non-transitory computer-readable medium described herein, the request includes an indication of a type of channel associated with the one or more first information blocks.

Some examples of the method, apparatuses, and non-transitory computer-readable medium described herein may further include operations, features, means, or instructions for communicating an indication of a start time for using the second key to encode the information, where communicating the second message may be based on communicating the indication of the start time.

In some examples of the method, apparatuses, and non-transitory computer-readable medium described herein, communicating the indication of the start time may include operations, features, means, or instructions for communicating, with the second wireless device, a first buffering time capability for a downlink shared channel transmission, a second buffering time capability for an uplink shared channel transmission, or any combination thereof.

In some examples of the method, apparatuses, and non-transitory computer-readable medium described herein, communicating the first message may include operations, features, means, or instructions for communicating, with the second wireless device, an uplink shared channel transmission or a downlink shared channel transmission that includes the first message.

In some examples of the method, apparatuses, and non-transitory computer-readable medium described herein, communicating the second message may include operations, features, means, or instructions for communicating, with the second wireless device, an uplink control channel transmission or a downlink control channel transmission that includes the second message.

In some examples of the method, apparatuses, and non-transitory computer-readable medium described herein, the at least the portion of the decoded one or more first information blocks includes at least a portion of one or more code blocks, one or more code block groups, one or more transport blocks, a first set of bits associated with one or more resource elements, a second set of bits associated with one or more resource block groups, or any combination thereof.

In some examples of the method, apparatuses, and non-transitory computer-readable medium described herein, the first wireless device includes one of a user equipment (UE) or a base station, and the second wireless device includes the other of the UE or the base station.

In some examples of the method, apparatuses, and non-transitory computer-readable medium described herein, the information includes control information or one or more second information blocks.

A method is described. The method may include transmitting, to a second wireless device, a first message, the first message including one or more first information blocks encoded based on a first key, receiving, from the second wireless device, an indication that the one or more first information blocks have been successfully decoded, where the one or more decoded information blocks are associated with an application of the second wireless device, and communicating, with the second wireless device, a second message, where the second message includes information that is encoded based on a second key that is derived from at least a portion of the one or more decoded first information blocks.

An apparatus is described. The apparatus may include a processor, memory coupled with the processor, and instructions stored in the memory. The instructions may be executable by the processor to cause the apparatus to transmit, to a second wireless device, a first message, the first message including one or more first information blocks encoded based on a first key, receive, from the second wireless device, an indication that the one or more first information blocks have been successfully decoded, where the one or more decoded information blocks are associated with an application of the second wireless device, and communicate, with the second wireless device, a second message, where the second message includes information that is encoded based on a second key that is derived from at least a portion of the one or more decoded first information blocks.

Another apparatus is described. The apparatus may include means for transmitting, to a second wireless device, a first message, the first message including one or more first information blocks encoded based on a first key, means for receiving, from the second wireless device, an indication that the one or more first information blocks have been successfully decoded, where the one or more decoded information blocks are associated with an application of the second wireless device, and means for communicating, with the second wireless device, a second message, where the second message includes information that is encoded based on a second key that is derived from at least a portion of the one or more decoded first information blocks.

A non-transitory computer-readable medium storing code is described. The code may include instructions executable by a processor to transmit, to a second wireless device, a first message, the first message including one or more first information blocks encoded based on a first key, receive, from the second wireless device, an indication that the one or more first information blocks have been successfully decoded, where the one or more decoded information blocks are associated with an application of the second wireless device, and communicate, with the second wireless device, a second message, where the second message includes information that is encoded based on a second key that is derived from at least a portion of the one or more decoded first information blocks.

Some examples of the method, apparatuses, and non-transitory computer-readable medium described herein may further include operations, features, means, or instructions for receiving, from the second wireless device, a third message, the third message including one or more second information blocks encoded based on a third key, where the third key may be derived from at least a portion of the one or more second information blocks.

Some examples of the method, apparatuses, and non-transitory computer-readable medium described herein may further include operations, features, means, or instructions for communicating, with the second wireless device, control signaling indicating the at least the portion of the decoded one or more first information blocks from which the second key may be derived.

In some examples of the method, apparatuses, and non-transitory computer-readable medium described herein, communicating the control signaling indicating the at least the portion may include operations, features, means, or instructions for communicating, with the second wireless device, the control signaling indicating a set of patterns for deriving keys from information blocks.

Some examples of the method, apparatuses, and non-transitory computer-readable medium described herein may further include operations, features, means, or instructions for communicating, with the second wireless device, second control signaling indicating to select one of the set of patterns for deriving the second key from the one or more first information blocks, where the control signaling includes radio resource control signaling and the second control signaling includes medium access control (MAC) control element signaling.

Some examples of the method, apparatuses, and non-transitory computer-readable medium described herein may further include operations, features, means, or instructions for communicating, after communicating the first message, radio resource control signaling, medium access control (MAC) control element signaling, downlink control information, or a downlink shared channel transmission including a request to derive the second key from the at least the portion of the decoded one or more first information blocks, where communicating the second message may be based on communicating the request.

In some examples of the method, apparatuses, and non-transitory computer-readable medium described herein, the request includes an indication of a type of channel associated with the one or more first information blocks.

Some examples of the method, apparatuses, and non-transitory computer-readable medium described herein may further include operations, features, means, or instructions for communicating, with the second wireless device, an indication of a start time for using the second key to encode the information, where communicating the second message may be based on communicating the indication of the start time.

In some examples of the method, apparatuses, and non-transitory computer-readable medium described herein, communicating the indication of the start time may include operations, features, means, or instructions for communicating, with the second wireless device, a first buffering time capability for a downlink shared channel transmission, a second buffering time capability for an uplink shared channel transmission, or any combination thereof.

In some examples of the method, apparatuses, and non-transitory computer-readable medium described herein, communicating the first message may include operations, features, means, or instructions for communicating, with the second wireless device, an uplink shared channel transmission or a downlink shared channel transmission that includes the first message.

In some examples of the method, apparatuses, and non-transitory computer-readable medium described herein, communicating the second message may include operations, features, means, or instructions for communicating, with the second wireless device, an uplink control channel transmission or a downlink control channel transmission that includes the second message.

In some examples of the method, apparatuses, and non-transitory computer-readable medium described herein, the at least the portion of the decoded one or more first information blocks includes at least a portion of one or more code blocks, one or more code block groups, one or more transport blocks, a first set of bits associated with one or more resource elements, a second set of bits associated with one or more resource block groups, or any combination thereof.

In some examples of the method, apparatuses, and non-transitory computer-readable medium described herein, the first wireless device includes one of a UE or a base station, and the second wireless device includes the other of the UE or the base station.

In some examples of the method, apparatuses, and non-transitory computer-readable medium described herein, the information includes control information or one or more second information blocks.

BRIEF DESCRIPTION OF THE DRAWINGS

FIG. 3 illustrates an example of an interception mitigation scheme that supports security key derivation using decoded information blocks in accordance with aspects of the present disclosure.

FIG. 8 shows a block diagram of a communications manager that supports security key derivation using decoded information blocks in accordance with aspects of the present disclosure.

FIGS. 10 through 14 show flowcharts illustrating methods that support security key derivation using decoded information blocks in accordance with aspects of the present disclosure.

DETAILED DESCRIPTION

A first wireless device (e.g., a user equipment (UE) or a base station) may communicate with a second wireless device (e.g., a UE or a base station). In some examples, failure to secure communications between the first wireless device and the second wireless device may enable a third wireless device to intercept and decode the communications. One method of securing communications may include the first wireless device or the second wireless device generating a key and encoding a transmission according to the generated key. In some examples, the first wireless device or the second wireless device may generate the key using channel randomness. However, overhead may be generated to communicate an explicit value of such a key between the first wireless device and the second wireless device.

The present disclosure describes techniques that may enable the first wireless device and the second wireless device to identify a same key without generating overhead when indicating a value of the key. For instance, the first wireless device may generate the key from one or more information blocks of one or more previously communicated transmissions that are encrypted using a secure key algorithm. For example, the key may be generated from a previously communicated physical uplink shared channel (PUSCH) transmission or a previously communicated physical downlink shared channel (PDSCH) transmission, which may use layer 3 security based on a shared secret key K between the UE and the network. Each of the one or more information blocks may include a code block (CB), a code block group (CBG), a transport block (TB), or any portion or combination thereof. After generating the key, the first wireless device may encode a physical uplink control channel (PUCCH) transmission or a physical downlink control channel (PDCCH) transmission using the generated key and may transmit the encoded PUCCH or PDCCH transmission to the second wireless device. The second wireless device may receive and successfully decode the PUCCH or PDCCH transmission by generating the key at the second wireless device and using the generated key to decode the PUCCH or PDCCH transmission.

Aspects of the disclosure are initially described in the context of wireless communications systems. Additional aspects of the disclosure are described in the context of a key generation diagram, an interception mitigation scheme, and a process flow. Aspects of the disclosure are further illustrated by and described with reference to apparatus diagrams, system diagrams, and flowcharts that relate to security key derivation using decoded information blocks.

Figure 1:
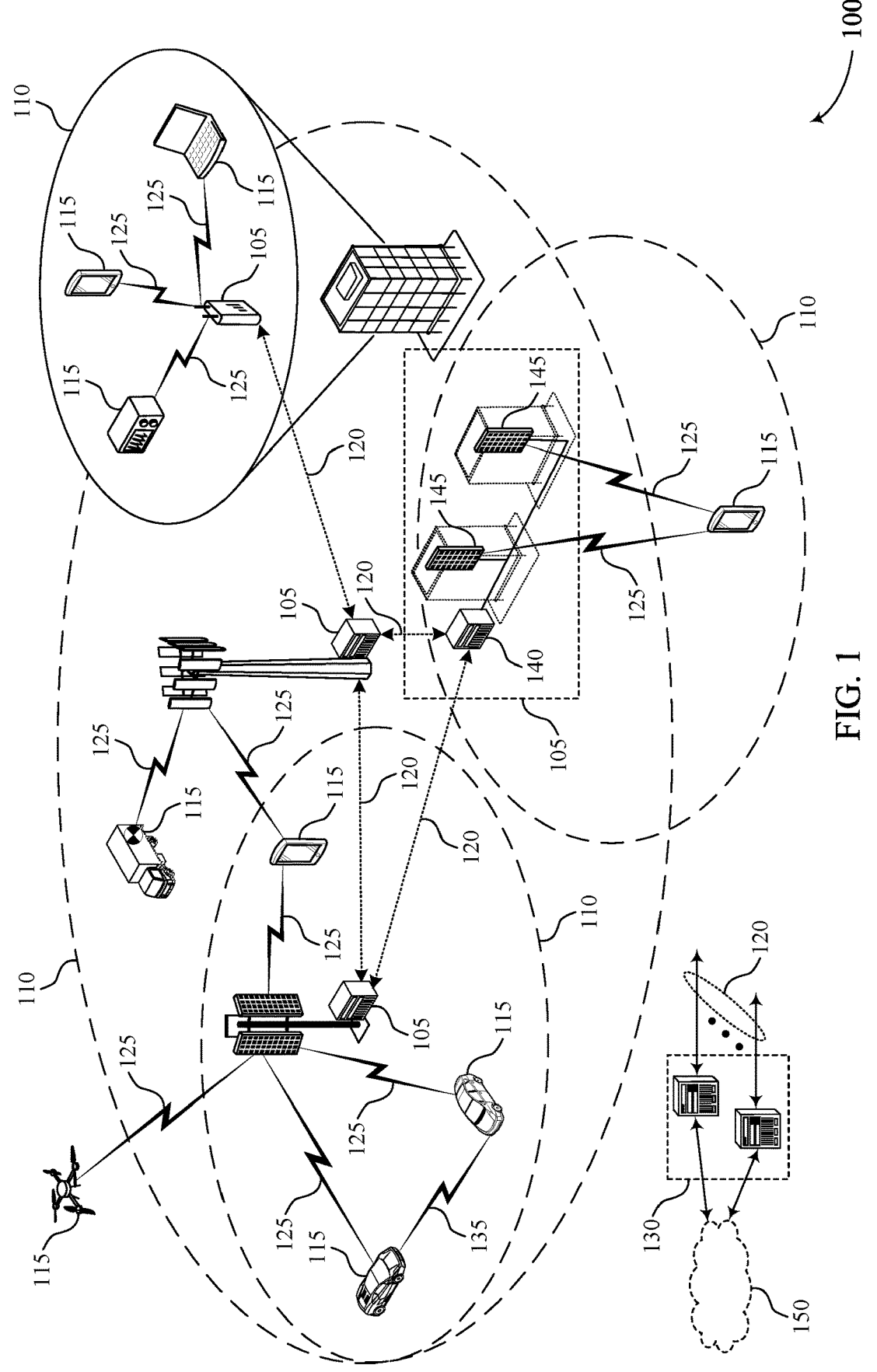
FIG. 1 illustrates an example of a wireless communications system that supports security key derivation using decoded information blocks in accordance with aspects of the present disclosure.

FIG. 1 illustrates an example of a wireless communications system 100 that supports security key derivation using decoded information blocks in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

In some examples, one or more components of the wireless commu-nications system 100 may operate as or be referred to as a network node. As used herein, a network node may refer to any UE 115, base station 105, entity of a core network 130, apparatus, device, or computing system configured to perform any techniques described herein. For example, a network node may be a UE 115. As another example, a network node may be a base station 105. As another example, a first network node may be configured to communicate with a second network node or a third network node. In one aspect of this example, the first network node may be a UE 115, the second network node may be a base station 105, and the third network node may be a UE 115. In another aspect of this example, the first network node may be a UE 115, the second network node may be a base station 105, and the third network node may be a base station 105. In yet other aspects of this example, the first, second, and third network nodes may be different. Similarly, reference to a UE 115, a base station 105, an apparatus, a device, or a computing system may include disclosure of the UE 115, base station 105, apparatus, device, or computing system being a network node. For example, disclosure that a UE 115 is configured to receive information from a base station 105 also discloses that a first network node is configured to receive information from a second network node. In this example, consistent with this disclosure, the first network node may refer to a first UE 115, a first base station 105, a first apparatus, a first device, or a first computing system configured to receive the information; and the second network node may refer to a second UE 115, a second base station 105, a second apparatus, a second device, or a second computing system.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless commu-nications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a ULE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s = 1/(\Delta f_{max} \cdot N_f)$ seconds, where $\Delta f_{max}$ may represent the maximum supported subcarrier spacing, and $N_f$ may represent the maximum supported discrete Fourier transform (DFT) size.

Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORE-SET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support commu-nications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC), central unit (CU), or distributed unit (DU). Each access network entity 140 may communicate with the UEs 115 through one or more other access network transmission entities 145, which may be referred to as radio units (RUs), radio heads, smart radio heads, remote radio heads (RRHs), or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105). Communication between a wireless device such as a base station 105 or UE 115 and a base station 105 may refer to communication between the device and any network entity 140 of the base station. For example, the phrases "transmitting," "receiving," or "communicating," when referring to a network entity 140, may refer to any network entity 140 of a RAN communicating with another device or node (e.g., directly or via one or more other network entities 140 or network transmission entities 145).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A first wireless device (e.g., a UE 115 or a base station 105) may communicate with a second wireless device (e.g., a UE 115 or a base station 105). In some examples, failure to secure communications between the first wireless device and the second wireless device may enable a third wireless device to intercept and decode the communications. One method of securing communications may include the first wireless device or the second wireless device generating a key and encoding a transmission according to the generated key. In some examples, the first wireless device or the second wireless device may generate the key using channel randomness. However, in order for both wireless devices to identify the key, the wireless device that generated the key may transmit signaling indicating an explicit value of the key to the other wireless device. However, transmitting the signaling may generate overhead and may reduce the efficiency of wireless communications.

The present disclosure describes techniques that may enable the first wireless device and the second wireless device to identify a same key without generating additional signaling explicitly indicating a value of the key. For instance, the first wireless device may generate the key from one or more information blocks of a previously communicated PUSCH transmission or a previously communicated PDSCH transmission. Each of the one or more information blocks may include a CB, a CBG, a TB, or any portion or combination thereof. After generating the key, the first wireless device may encode a PUCCH transmission or a PDCCH transmission using the generated key and may transmit the encoded PUCCH or PDCCH transmission to the second wireless device. The second wireless device may receive and successfully decode the PUCCH or PDCCH transmission by generating the key at the second wireless device and using the generated key to decode the PUCCH or PDCCH transmission.

Figure 2:
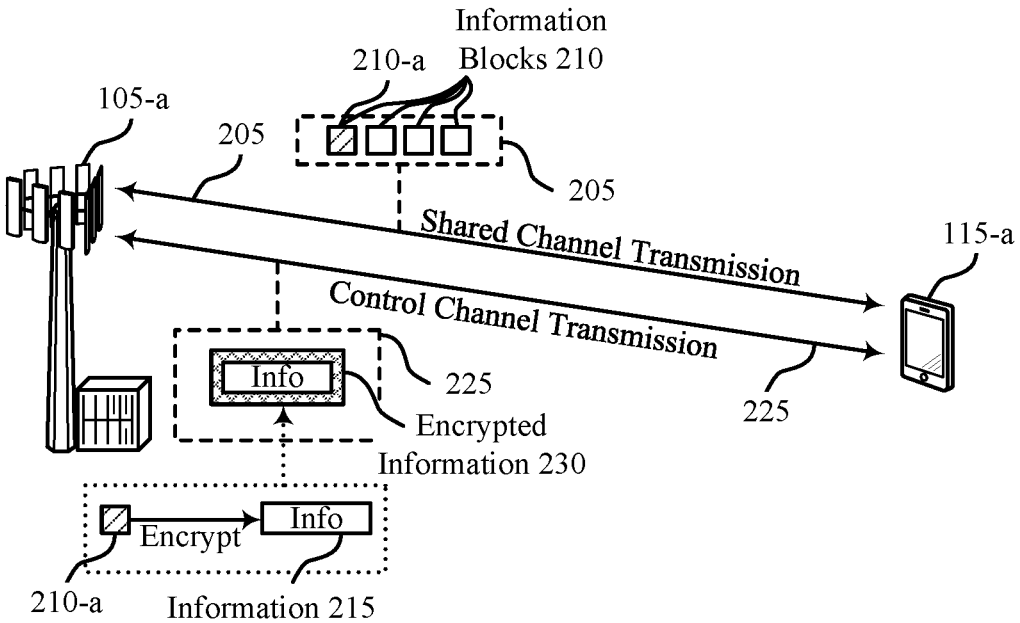
FIG. 2 illustrates an example of a wireless communications system that supports security key derivation using decoded information blocks in accordance with aspects of the present disclosure.

FIG. 2 illustrates an example of a wireless communications system 200 that supports security key derivation using decoded information blocks in accordance with aspects of the present disclosure. In some examples, wireless communications system 200 may implement one or more aspects of wireless communications system 100. For instance, UE 115-*a* may be an example of a UE 115 as described with reference to FIG. 1 and base station 105-*a* may be an example of a base station 105 as described with reference to FIG. 1.

Secure communications in a wireless communications system 200 (e.g., a wireless communications system implementing IoT communications) may prevent and/or mitigate communications from being intercepted (e.g., eavesdropped) and/or decoded by wireless devices for which the communications are not intended. For instance, PUSCH and/or PDSCH transmissions may be secured (e.g., encrypted) at an upper layer (e.g., a layer above the physical (PHY) layer, such as layer 3 (L3), which may also be referred to as the RRC layer). Accordingly, PUSCH transmissions and/or PDSCH transmissions may be secure even if not encrypted at the PHY layer. However, PDCCH and/or PUCCH transmissions may not be secured (e.g., encrypted) at an upper layer, such as L3. Accordingly, if the PDCCH transmissions and/or PUCCH transmissions are not encrypted at the PHY layer, the PUCCH transmission and/or PDCCH transmissions may not be secure. One example of PHY security, which may be security applied to the PHY layer of communications. For instance, wireless devices may reuse correctly decoded packets and/or TBs as a key (e.g., a secret key (SK)) to secure other PHY channels, such as a PUCCH and/or a PDCCH channel. Such techniques, in some examples, may not increase a payload size to indicate the key. Instead, a correctly decoded payload (e.g., a correctly decoded PDSCH and/or PUSCH payload) may be used for generating the key and securing a transmission.

In some examples, the key may be obtained from a channel using channel randomness and/or upper-layer (e.g., layers above the PHY layer), such as a Diffie Hellman technique or other methods including PHY layer parameters or cell identifiers. Additionally, other methods may include signaling the key that may be used to secure the PHY channels (e.g., via uplink control information (UCI) or downlink control information (DCI)) in a secured channel (e.g., PDSCH, PUSCH). For example, radio resource control (RRC) signaling may be used to signal a secret key. However, signaling the key using a secured channel creates additional overhead, which may reduce throughput of information between the wireless devices. The present disclosure describes techniques for using a previously successfully decoded information block (e.g., CB, CBG, TB) partially or fully as the key for PHY channels that are not secured. Additionally, the present disclosure may describe examples in which a key (e.g., a single key bit stream) is derived from multiple PDSCH transmissions and/or multiple PUSCH transmissions. Additionally, the present disclosure may provide an indication of which part of a transmission to be used as a key as well as an associated timeline.

In some examples, a first wireless device (e.g., one of a UE 115-a or base station 105-a) may use a recently successfully decoded shared channel transmission 205 (e.g., a PDSCH and/or PUSCH transmission) as a key for securing a control channel transmission 225 (e.g., a PUCCH and/or PDCCH transmission) with a second wireless device (e.g., the other of the UE 115-a or base station 105-a). The second wireless device may use one or more downlink shared channel transmissions and/or uplink shared channel transmissions to generate a single key. For instance, the second wireless device may indicate to use one or more information blocks 210 of shared channel transmission 205 to generate the key. In some examples, the bits for the key may be obtained based on a relation between decrypted bits and the bits given in the information blocks. In some such examples, the first wireless device or the second wireless device may use the corresponding decrypted bits on those information blocks to generate the key. The one or more information blocks 210 may include a portion of a certain CB; a certain CBG (e.g., where each CB within the CBG is accumulated as the key); a portion of two or more CBGs; a portion of a TB (e.g., a portion or a masking, such as downselection, of the payload size); multiple CBs, CBGs, or TBs received across multiple shared channel transmissions (e.g., where each transmission is received from a same transmitter); or any combination thereof on a certain component carrier (CC) index, a certain bandwidth part (BWP), a certain configured grant (CG) index, a certain semi-persistently scheduled (SPS) index, or any combination thereof. In a case in which multiple TRPs are present, the second wireless device may indicate which TRP to use and which UCI and/or DCI of which TRP to secure. In some examples, the bits for the key may be obtained based on a relation between decrypted bits and bits sent on particular resources. For instance, the one or more information blocks 210 may be associated with bits received on certain resource elements (REs) or bits received on certain resource block groups (RBGs), and the first wireless device or the second wireless device may use the decrypted bits from the certain REs and/or the certain RBGs to generate the key.

In one example, UE 115-a may communicate, with base station 105-a, a shared channel transmission 205, the first message including one or more information blocks 210 based on a first key. UE 115-a may communicate, with base station 105-a, a control channel transmission 225, where the control channel transmission 225 includes information 215 encoded based on a second key that is derived from at least a portion of the one or more information blocks 210. For instance, information 215 may be encoded based on a second key that is derived from information block 210-a to generate encoded information 230, which may be included in the control channel transmission 225

In some examples, the shared channel transmission 205 used for generating the key may be received in a first shot transmission (e.g., not a retransmission), which may enable increased security and to lower a chance that an intercepting wireless device may combine and/or retrieve information by receive multiple versions of the same TB. Before using the bits to be used as a key, the first wireless device (e.g., base station 105-a, UE 115-a) may perform modifications or encoding such as hashing or applying a polynomial on data bits (e.g., bits of the one or more information blocks 210) before making them keys. Additionally, a secret-key derivation (SKD) function may be applied to the data bits as part of deriving a key from the one or more information blocks 210.

In some examples, the second wireless device (e.g., base station 105-a) may indicate which portion and/or bitmap is to be used to determine the key. For instance, if RRC signaling is sent in secured transmissions, the second wireless device may transmit RRC signaling indicating the portion and/or the bitmap. If medium access control (MAC) control element (MAC-CE) signaling is sent in secured transmissions, the second wireless may transmit a MAC-CE to dynamically change the masking and/or bitmap that is applied to a portion of the one or more information blocks 210 (e.g., CBs, CBGs, TBs) to generate the key. Additionally, or alternatively, the second wireless device (e.g., base station 105-a) may indicate, via RRC signaling and/or MAC-CE signaling, a set of patterns and/or a set of bitmaps that extract the key from a payload (e.g., a payload including the one or more information blocks). For instance, the RRC signaling may indicate a set of L patterns and/or bitmaps, and the MAC-CE signaling may indicate which of the L patterns and/or bitmaps to use in generating the key. Accordingly, the first wireless device may downselect to a single pattern or bitmap each time a payload is received.

In some examples, the second wireless device (e.g., base station 105-a) may indicate (e.g., using an index) to the first wireless device (e.g., UE 115-a) to reuse a PDSCH and/or PUSCH payload to be used as a key using preconfigured bitmaps or bitmaps sent via signaling (e.g., RRC signaling, MAC-CE signaling, DCI). For instance, the first wireless device and the second wireless device may use a PDSCH transmission and a PUSCH transmission to generate a single key bit stream). In one example, at a time t, the second wireless device may request to use an ACKed PDSCH at time t-x, where x>0, as the key for a next window of transmissions of PDCCH and/or PUCCH transmissions. The indication may include the type of channel (e.g., PDSCH, PUSCH, or both). This indication may be conveyed in a secured transmission or an unsecured transmission (e.g., DCI). However, even if the indication is not secured, the PDSCH and/or PUSCH from which the key is derived may be secured. Additionally, the techniques described herein may be used to secure the transmission including the indication when conveyed via DCI.

In some examples, the first wireless device (e.g., UE 115-*a*) and the second wireless device (e.g., base station 105-*a*) may agree on a time to start using a newly generated key. For instance, the time for using the key may be after X symbols from an indication to use a certain PDSCH and/or a set of PDSCHs to generate the key. Additionally, the key may be used for a time duration and may be refreshed according to an interval and/or used until a next indication to generate a new key is received.

The techniques described herein may be associated with one or more advantages. For instance, generating the key at both the first wireless device and the second wireless device may reduce overhead, as the first wireless device and the second wireless device communicate a value of a key based on information already included in a shared channel transmission. Reducing overhead may increase the efficiency of wireless communications.

FIG. 3 illustrates an example of an interception mitigation scheme 300 that supports security key derivation using decoded information blocks in accordance with aspects of the present disclosure. In some examples, interception mitigation scheme 300 may implement one or more aspects of wireless communications systems 100 and/or 200. For instance, UEs 115-*b* and 115-*c* may be examples of UEs 115 as described with reference to FIG. 1 and base station 105-*b* may be an example of a base station 105 as described with reference to FIG. 1. Additionally, control channel transmission 225-*a* may be an example of a control channel transmission 225 as described with reference to FIG. 2 and encoded information 230-*a* may be an example of encoded information 230 as described with reference to FIG. 2.

In some examples, a first wireless device (e.g., one of base station 105-*b* and UE 115-*b*) may communicate control channel transmission 225-*a* with a second wireless device (e.g., the other of base station 105-*b* and UE 115-*b*), where control channel transmission 225-*a* may include encoded information 230-*a*. Encoded information 230-*a* may be encrypted using a key derived from one or more information blocks as described herein. For instance, the second wireless device may communicate a shared channel transmission with the first wireless device and the first wireless device may use information blocks associated with the shared channel transmission to derive the key. In some examples, the first wireless device may communicate multiple shared channel transmissions (e.g., multiple PUSCH transmissions and/or multiple PDSCH transmissions) and may use each of the multiple shared channel transmissions to derive the key. In some examples, the second wireless device may indicate, to the first wireless device, which portion of a shared channel transmission (e.g., which information block) to use to derive the key. Additionally, the second wireless device may indicate, to the first wireless device, a set of bitmaps and/or a set of patterns that the second wireless device may use to derive the key from one or more information blocks, and may also indicate which of the set of bitmaps and/or set of patterns to use to derive the key. The first wireless device or the second wireless device may use the decrypted bits associated with resources indicated by the set of bitmaps or set of patterns to generate the key. Because control channel transmission 225-*a* may be secured according to the key, UE 115-*c* may fail to successfully decrypt control channel transmission 225-*a*.

The key may secure control channel transmission 225-*a* in one or more ways. For instance, the key may be used with control channel transmission 225-*a* to generate a hash key that the first wireless device or the second wireless device may use to decrypt control channel transmission 225-*a*. Additionally or alternatively, the key may be used to scramble control channel transmission 225-*a*. In some examples, the key may be used in conjunction with a stream cipher and/or a block cipher in order to encrypt control channel transmission 225-*a*.

Figure 4:
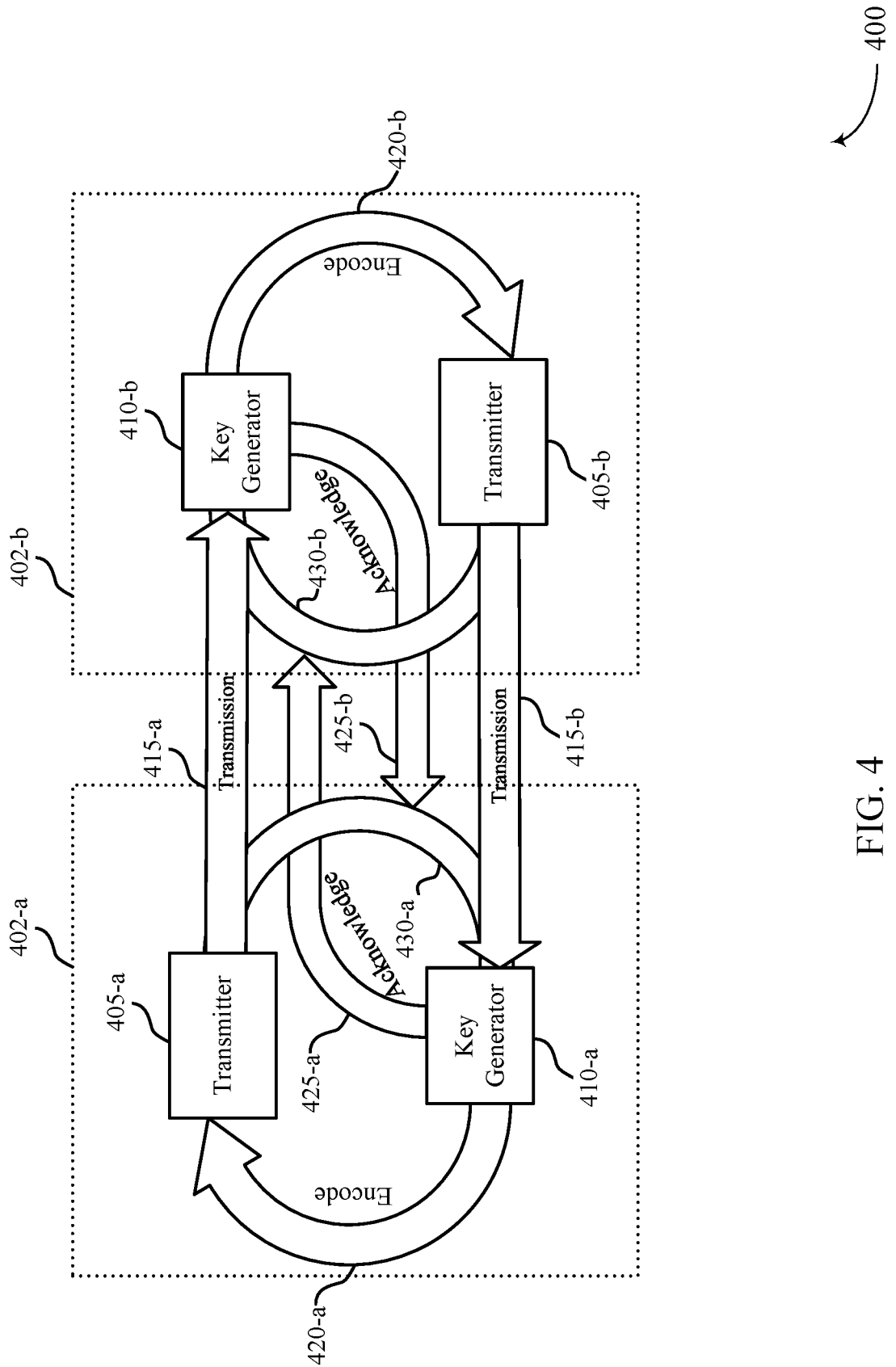
FIG. 4 illustrates an example of a key generation diagram that supports security key derivation using decoded information blocks in accordance with aspects of the present disclosure

FIG. 4 illustrates an example of a key generation diagram 400 that supports security key derivation using decoded information blocks in accordance with aspects of the present disclosure. In some examples, key generation diagram 400 may be implemented by one or more aspects of wireless communications system 100. For instance, wireless devices 402-*a* and 402-*b* may each be an example of a UE 115 or a base station 105 as described with reference to FIG. 1. In some examples, key generation diagram 400 may illustrate chains of keys being generated from subsequent chains of transmissions (e.g., shared data transmissions).

In some examples, wireless device 402-*a* may include a transmitter 405-*a* and a key generator 410-*a* and wireless device 402-*b* may include a transmitter 405-*b* and a key generator 410-*b*. At an initial time, transmitter 405-*a* may transmit a first transmission at 415-*a* to wireless device 402-*b*. In some examples, wireless device 402-*b* may transmit, to first wireless device 402-*a* at 425-*b*, an acknowledgement that the first transmission has been received.

In some examples, key generator 410-*b* may use information (e.g., information blocks) included in the first transmission received at 415-*b* to generate a key, where the information is associated with an application of second wireless device 402-*b*. For instance, the information may include blocks or bits of shared channel data associated with applications of second wireless device 402-*b* and/or processed as application data (e.g., sent to a higher layer for processing). Second wireless device 402-*b* may encode a second transmission (e.g., a PDSCH transmission, a PUSCH transmission) using the key generated by key generator 410-*b* and may pass the transmission to transmitter 405-*b*. Transmitter 405-*b* may transmit the second transmission to first wireless device 402-*a*. First wireless device 402-*a* may also generate the same key used to encode the second transmission via key generator 410-*a* using the same information (e.g., same bits or blocks of shared channel data) included in the first transmission that key generator 410-*b* used to generate the key. The first wireless device 402-*a* and/or the second wireless device 402-*b* may use the decrypted bits (or bits prior to encryption) of the information blocks to generate the key. Additionally, first wireless device 402-*a* may use the generated key to decrypt and/or decode the second transmission. In some examples, wireless device 402-*a* may transmit, to second wireless device 402-*b* at 425-*a*, an acknowledgement that that the transmission has been received.

In some examples, key generator 410-*a* may use information (e.g., information blocks) included in the first transmission (e.g., in examples in which an acknowledgement was received at 425-*b* for the first transmission) received by key generator 410-*a* at 430-*a* to generate a key for a third transmission (e.g., a PDSCH transmission, a PUSCH transmission), where the information is associated with an application of second wireless device 402-*b*. Additionally or alternatively, key generator 410-*a* may use information (e.g., bits or blocks of shared channel data) included in the first transmission, the second transmission, or any combination thereof, received at 415-*b* to generate the key for the third transmission, where the information is associated with an application of first wireless device 402-*a*. For instance, the information may include blocks or bits of shared channel data associated with applications of first wireless device 402-*a* and/or second wireless device 402-*b*, where the information may be processed as application data (e.g., sent to a higher layer for processing and use by the applications). The first wireless device 402-*a* and/or the second wireless device 402-*b* may use the decrypted bits (or bits prior to encryption) of the bits or blocks of shared channel data to generate the key for the third transmission.

At 420-*a*, first wireless device 402-*a* may use the key for the third transmission to encode the third transmission and may pass the third transmission to transmitter 405-*a*. Transmitter 405-*a* may transmit the third transmission to second wireless device 402-*b* at 415-*a*. Second wireless device 402-*b* may also generate the same key used to encode the third transmission via key generator 410-*b* using the same information (e.g., same bits or blocks of shared channel data) included in the first transmission and/or the second transmission that key generator 410-*b* used to generate the key. Additionally, second wireless device 402-*b* may use the generated key to decrypt and/or decode the third transmission. In some examples, wireless device 402-*b* may transmit, to first wireless device 402-*a* at 425-*b*, an acknowledgement that that the third transmission has been received.

In some examples, key generator 410-*b* may use information (e.g., information blocks) included in the first transmission, the second transmission (e.g., in examples in which an acknowledgement was received at 425-*a* for the second transmission) received by key generator 410-*b* at 430-*b*, or both to generate a key for a fourth transmission (e.g., a PDSCH transmission, a PUSCH transmission), where the information is associated with an application of second wireless device 402-*b*, first wireless device 402-*b*, or both, respectively. Additionally or alternatively, key generator 410-*b* may use information (e.g., bits or blocks of shared channel data) included in the first transmission, the second transmission, the third transmission, or any combination thereof, to generate the key for the fourth transmission, where the information is associated with an application of second wireless device 402-*b*. For instance, the information may include blocks or bits of shared channel data associated with applications of first wireless device 402-*a* and/or second wireless device 402-*b*, where the information may be processed as application data (e.g., sent to a higher layer for processing). The first wireless device 402-*a* and/or the second wireless device 402-*b* may use the decrypted bits (or bits prior to encryption) of the bits or blocks of shared channel data to generate the key for the fourth transmission.

At 420-*b*, second wireless device 402-*b* may use the key for the fourth transmission to encode the fourth transmission and may pass the fourth transmission to transmitter 405-*b*. Transmitter 405-*b* may transmit the fourth transmission to first wireless device 402-*a* at 415-*b*. First wireless device 402-*a* may also generate the same key used to encode the fourth transmission via key generator 410-*a* using the same information (e.g., same bits or blocks of shared channel data) included in the first transmission, the second transmission, the third transmission, or any combination thereof that key generator 410-*b* used to generate the key. Additionally, first wireless device 402-*a* may use the generated key to decrypt and/or decode the fourth transmission.

Figure 5:
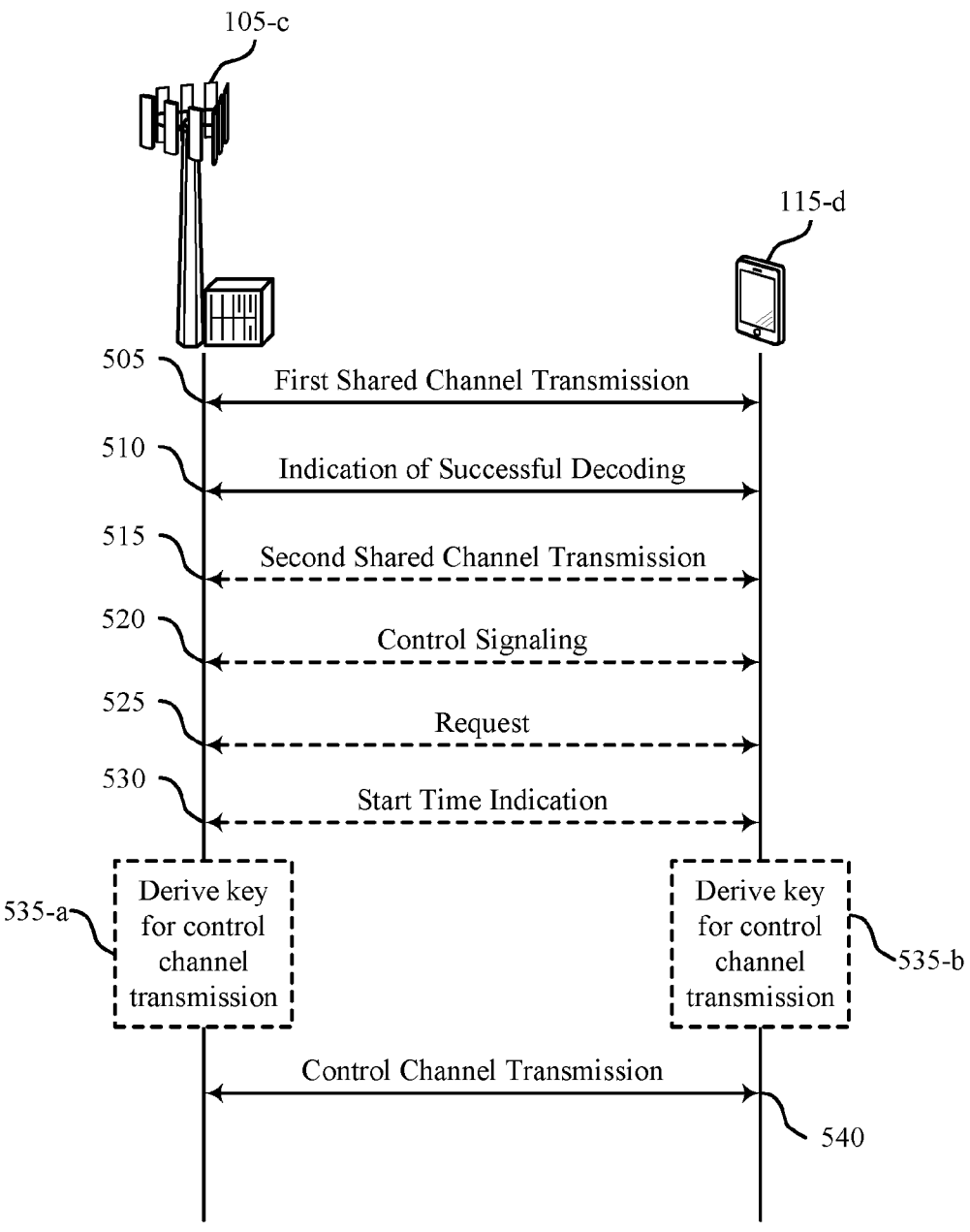
FIG. 5 illustrates an example of a process flow that supports security key derivation using decoded information blocks in accordance with aspects of the present disclosure.

FIG. 5 illustrates an example of a process flow 500 that supports security key derivation using decoded information blocks in accordance with aspects of the present disclosure. In some examples, process flow 500 may implement one or more aspects of wireless communications system 100. For instance, UE 115-*d* may be an example of a UE 115 as described with reference to FIG. 1 and base station 105-*c* may be an example of a base station 105 as described with reference to FIG. 1.

At 505, UE 115-*d* may communicate a first message (e.g., a first shared channel transmission, such as a PDSCH transmission or a PUSCH transmission) with base station 105-*c*. The first message may include one or more first information blocks encoded based on a first key, where the one or more first information blocks are associated with an application of UE 115-*d*. In some examples, each of the one or more first information blocks may be associated with a CC index, a BWP, a CG index, a SPS index, or any combination thereof.

At 510, UE 115-*d* may communicate, with base station 105-*c*, an indication that the one or more first information blocks have been successfully decoded. For instance, if UE 115-*d* transmits the first message, UE 115-*d* may receive the indication of successful decoding from base station 105-*c*. However, if UE 115-*d* receives the first message, UE 115-*d* may transmit the indication of successful decoding to base station 105-*c*. In some examples, UE 115-*d* may pass the decoded one or more first information blocks to the application.

At 515, UE 115-*d* may communicate a third message (e.g., a second shared channel transmission, such as a PDSCH transmission or a PUSCH transmission) with base station 105-*c*. In some such examples, UE 115-*d* may decode one or more additional information blocks associated with the third message and may pass the decoded one or more additional information blocks to the application.

At 520, UE 115-*d* may communicate control signaling with base station 105-*c*. In some examples, the control signaling (e.g., at 520) may indicate the at least the portion of the decoded one or more first information blocks from which a second key is to be derived (e.g., at 540). In some examples, the control signaling may indicate a set of patterns for deriving keys from information blocks. Additionally, UE 115-*d* may communicate second control signaling indicating to select one of the set of patterns for deriving the second key from the one or more first information blocks. In some such examples, the control signaling may include or be an example of RRC signaling and the second control signaling may include or be an example of MAC-CE signaling.

At 525, UE 115-*d* may communicate, with base station 105-*c*, a request to derive a second key (e.g., at 540) from at least a portion of the decoded one or more first information blocks. For instance, the request may indicate to derive the second key from information blocks of the first message (e.g., received at 505), the third message (e.g., received at 515), or both. The request may be conveyed via RRC signaling, MAC-CE signaling, DCI, or a downlink shared channel transmission (e.g., a PDSCH transmission). Additionally, the request may include one or more parameters indicating which previously received transmission and/or which portion (e.g., which information blocks) of the previously received transmission to use to derive the second key. For instance, the request may include a parameter indicating that the P most recently received shared channel messages (e.g., PUSCH and/or PDSCH messages) may be used to derive the key. Additionally or alternatively, the request may include a parameter indicating that the P most recently received shared channel messages (e.g., PUSCH and/or PDSCH) relative to a particular time (e.g., prior to t-q, where t may be a time at which the request is received and q may be a configured or preconfigured positive integer value) may be used to derive the key. Additionally or alternatively, the request may include a parameter indicating one or more bitmaps or patterns used to derive the key from a previously received transmission.

At 530, UE 115-*d* may communicate, with base station 105-*c*, an indication of a start time for using a second key to encode information (e.g., at 540). In some examples, communicating the indication may include UE 115-*d* transmitting, to base station 105-*c*, a first buffering time capability for a downlink shared channel transmission, a second buffering time capability for an uplink shared channel transmission, or both.

At 535-*a*, base station 105-*c* may derive a second key. At 535-*b*, UE 115-*d* may derive the second key. Base station 105-*c* and/or UE 115-*d* may derive the second key based on applying a key derivation function to the at least the portion of the decoded one or more first information blocks.

At 540, UE 115-*d* may communicate, with base station 105-*c*, a second message (e.g., a control channel transmission, such as a PUCCH transmission or a PDCCH transmission). The second message may include information encoded based on the second key derived from at least a portion of the decoded one or more first information blocks (e.g., at 535-*a* and/or 535-*b*). Additionally, the second key may be derived from at least a portion of the one or more second information blocks. In some examples, communicating the second message may be based on communicating the request, the indication of the start time, or both. In some examples, the at least the portion of the decoded one or more first information blocks may include at least a portion of one or more CBs, one or more CBGs, one or more TBs, a first set of bits associated with one or more REs, a second set of bits associated with one or more RBGs, or any combination thereof. In some examples, the information of the second message may include control information or one or more second information blocks.

Figure 6:
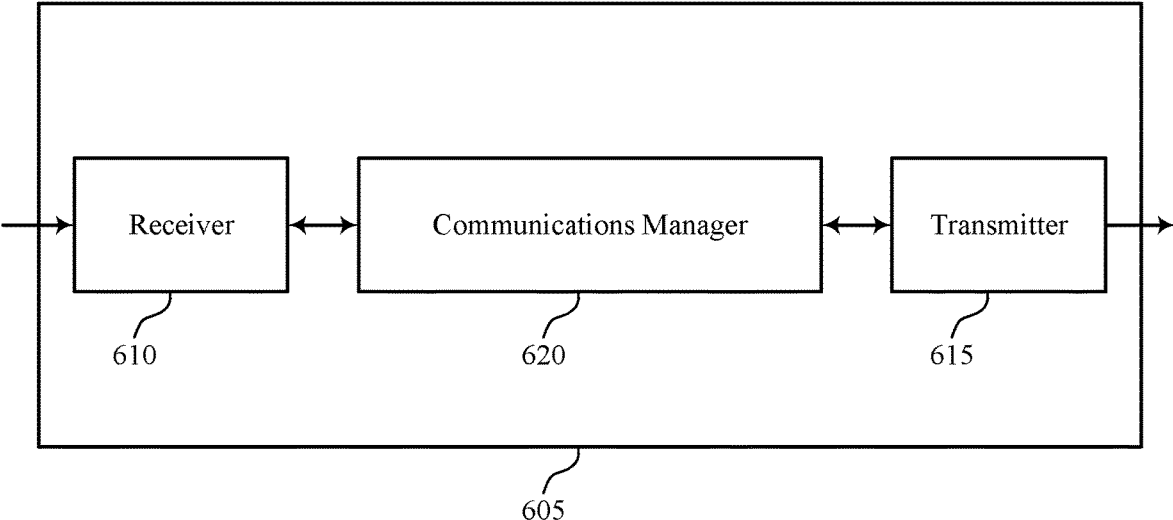
FIGS. 6 and 7 show block diagrams of devices that support security key derivation using decoded information blocks in accordance with aspects of the present disclosure.

FIG. 6 shows a block diagram 600 of a device 605 that supports security key derivation using decoded information blocks in accordance with aspects of the present disclosure. The device 605 may be an example of aspects of a UE 115 or a base station 105 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to security key derivation using decoded information blocks). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to security key derivation using decoded information blocks). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of security key derivation using decoded information blocks as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 620 may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

Additionally, or alternatively, the communications manager 620 may support wireless communication at a first wireless device in accordance with examples as disclosed herein. For example, the communications manager 620 may be configured as or otherwise support a means for receiving, from a second wireless device, a first message, the first message including one or more first information blocks encoded based on a first key, where the one or more first information blocks are associated with an application of the first wireless device. The communications manager 620 may be configured as or otherwise support a means for transmitting, to the second wireless device, an indication that the one or more first information blocks have been successfully decoded. The communications manager 520 may be configured as or otherwise support a means for passing the decoded one or more first information blocks to the application. The communications manager 620 may be configured as or otherwise support a means for communicating, with the second wireless device, a second message, where the second message includes information that is encoded based on a second key that is derived from at least a portion of the decoded one or more first information blocks.

Additionally, or alternatively, the communications manager 620 may support wireless communication at first wireless device in accordance with examples as disclosed herein. For example, the communications manager 620 may be configured as or otherwise support a means for transmitting, to a second wireless device, a first message, the first message including one or more first information blocks encoded based on a first key. The communications manager 620 may be configured as or otherwise support a means for receiving, from the second wireless device, an indication that the one or more first information blocks have been successfully decoded, where the one or more decoded information blocks are associated with an application of the second wireless device. The communications manager 620 may be configured as or otherwise support a means for communicating, with the second wireless device, a second message, where the second message includes information that is encoded based on a second key that is derived from at least a portion of the one or more decoded first information blocks.

By including or configuring the communications manager 620 in accordance with examples as described herein, the device 605 (e.g., a processor controlling or otherwise coupled to the receiver 610, the transmitter 615, the communications manager 620, or a combination thereof) may support techniques for reducing overhead when communicating a value of a key between the device 505 and another wireless device.

Figure 7:
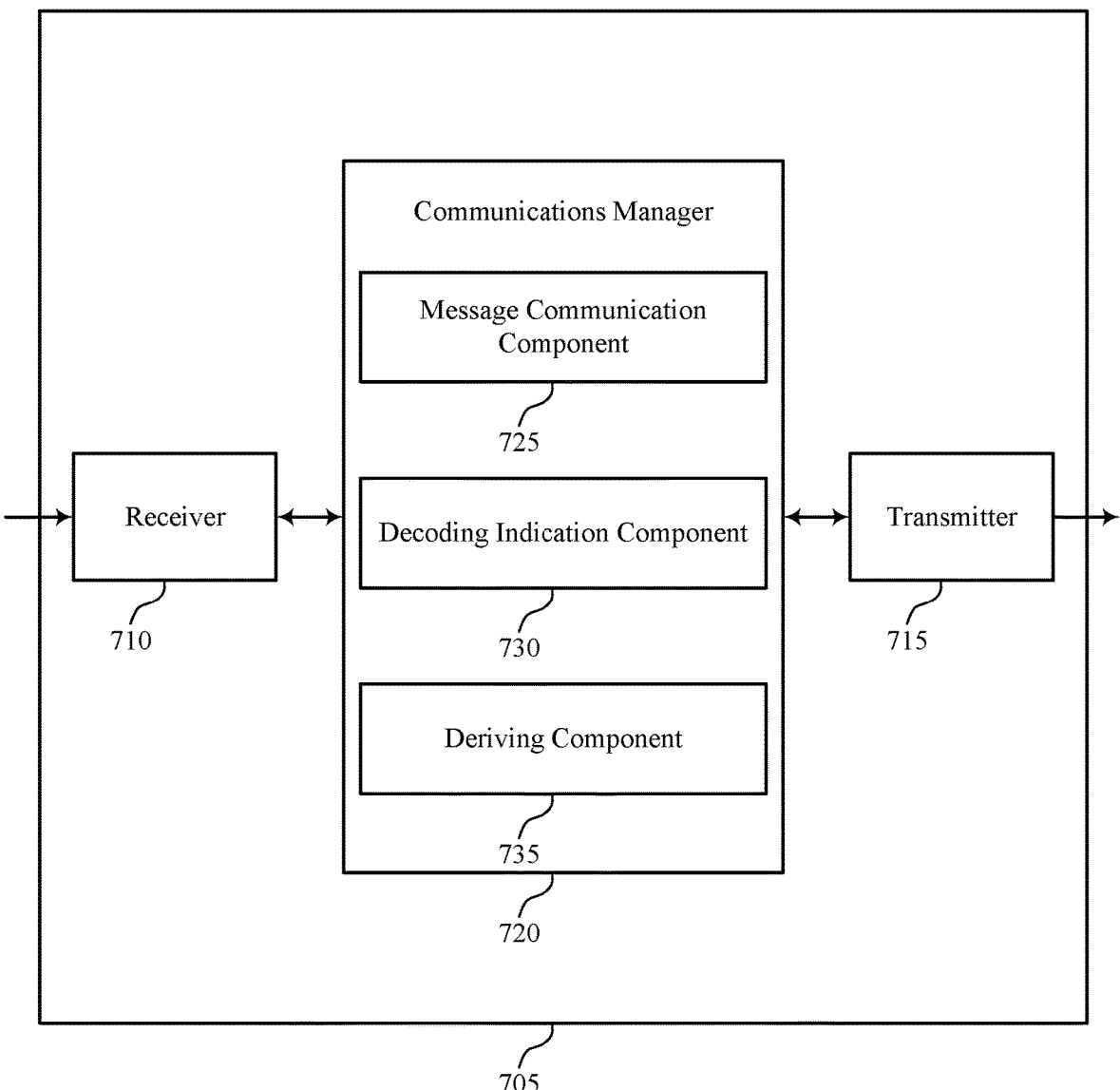

FIG. 7 shows a block diagram 700 of a device 705 that supports security key derivation using decoded information blocks in accordance with aspects of the present disclosure. The device 705 may be an example of aspects of a device 605 or a UE 115 or a base station 105 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to security key derivation using decoded information blocks). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to security key derivation using decoded information blocks). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of security key derivation using decoded information blocks as described herein. For example, the communications manager 720 may include a message communication component 725, a decoding indication component 730, a deriving component 735, or any combination thereof. The communications manager 720 may be an example of aspects of a communications manager 620 as described herein. In some examples, the communications manager 720, or various components thereof, may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communication at a first wireless device in accordance with examples as disclosed herein. The message communication component 725 may be configured as or otherwise support a means for receiving, from a second wireless device, a first message, the first message including one or more first information blocks encoded based on a first key, where the one or more first information blocks are associated with an application of the first wireless device. The decoding indication component 730 may be configured as or otherwise support a means for transmitting, to the second wireless device, an indication that the one or more first information blocks have been successfully decoded. In some examples, the decoding indication component 630 may be configured as or otherwise support a means for passing the decoded one or more first information blocks to the application. The message communication component 725 may be configured as or otherwise support a means for communicating, with the second wireless device, a second message, where the second message includes information that is encoded based on a second key that is derived from at least a portion of the decoded one or more first information blocks.

Additionally, or alternatively, the communications manager 720 may support wireless communication at first wireless device in accordance with examples as disclosed herein. The message communication component 725 may be configured as or otherwise support a means for transmitting, to a second wireless device, a first message, the first message including one or more first information blocks encoded based on a first key. The deriving component 735 may be configured as or otherwise support a means for receiving, from the second wireless device, an indication that the one or more first information blocks have been successfully decoded, where the one or more decoded information blocks are associated with an application of the second wireless device. The message communication component 725 may be configured as or otherwise support a means for communicating, with the second wireless device, a second message, where the second message includes information that is encoded based on a second key that is derived from at least a portion of the one or more decoded first information blocks.

FIG. 8 shows a block diagram 800 of a communications manager 820 that supports security key derivation using decoded information blocks in accordance with aspects of the present disclosure. The communications manager 820 may be an example of aspects of a communications manager 620, a communications manager 720, or both, as described herein. The communications manager 820, or various components thereof, may be an example of means for performing various aspects of security key derivation using decoded information blocks as described herein. For example, the communications manager 820 may include a message communication component 825, a decoding indication component 830, a deriving component 835, a control signaling component 840, a request component 845, a start time indication component 850, or any combination thereof. Each of these components may communicate, directly or indirectly, with one another (e.g., via one or more buses).

Additionally, or alternatively, the communications manager 820 may support wireless communication at a first wireless device in accordance with examples as disclosed herein. The message communication component 825 may be configured as or otherwise support a means for receiving, from a second wireless device, a first message, the first message including one or more first information blocks encoded based on a first key, where the one or more first information blocks are associated with an application of the first wireless device. For instance, message communication component 825 may receive an indication 826 of the first message. The decoding indication component 830 may be configured as or otherwise support a means for transmitting, to the second wireless device, an indication that the one or more first information blocks have been successfully decoded. For instance, decoding indication component 830 may transmit an indication 831 that the one or more first information blocks have been successfully decoded. In some examples, decoding indication component 830 may be configured as or otherwise support a means for passing the decoded one or more first information blocks to the application. In some examples, message communication component 825 may transmit, to decoding indication component 830, an indication 833 of the first message. In some examples, the message communication component 825 may be configured as or otherwise support a means for communicating, with the second wireless device, a second message, where the second message includes information that is encoded based on a second key that is derived from at least a portion of the decoded one or more first information blocks. For instance, message communication component 825 may communicate a second message 828.

In some examples, the message communication component 825 may be configured as or otherwise support a means for transmitting, to the second wireless device, a third message, the third message including one or more second information blocks encoded based on a third key, where the third key is derived from at least a portion of the one or more second information blocks. For instance, message communication component 825 may transmit an indication 827 of a third message.

In some examples, the control signaling component 840 may be configured as or otherwise support a means for communicating, with the second wireless device, control signaling 841 indicating the at least the portion of the decoded one or more first information blocks from which the second key is derived. In some examples, control signaling component 840 may communicate, with message communication component 825, an indication 843 of the at least the portion of the decoded one or more first information blocks.

In some examples, to support communicating the control signaling indicating the at least the portion of the decoded one or more first information blocks, the control signaling component 840 may be configured as or otherwise support a means for communicating, with the second wireless device, the control signaling indicating a set of patterns for deriving keys from information blocks.

In some examples, the control signaling component 840 may be configured as or otherwise support a means for communicating, with the second wireless device, second control signaling indicating to select one of the set of patterns for deriving the second key from the one or more first information blocks, where the control signaling includes radio resource control signaling and the second control signaling includes medium access control (MAC) control element signaling.

In some examples, the request component 845 may be configured as or otherwise support a means for communicating, after communicating the first message, radio resource control signaling, medium access control (MAC) control element signaling, downlink control information, or a downlink shared channel transmission including a request 851 to derive the second key from the at least the portion of the decoded one or more first information blocks, where communicating the second message is based on communicating the request. In some examples, request component 845 may communicate an indication 848 of the request and/or the at least the portion of the decoded one or more information blocks with message communication component 825.

In some examples, the request includes an indication of a type of channel associated with the one or more first information blocks.

In some examples, the start time indication component 850 may be configured as or otherwise support a means for communicating an indication 846 of a start time for using the second key to encode the information, where communicating the second message is based on communicating the indication of the start time. In some examples, start time indication component 850 may communicate an indication 853 of the start time with message communication component 825.

In some examples, to support communicating the indication of the start time, the start time indication component 850 may be configured as or otherwise support a means for communicating, with the second wireless device, a first buffering time capability for a downlink shared channel transmission, a second buffering time capability for an uplink shared channel transmission, or any combination thereof.

In some examples, the deriving component 835 may be configured as or otherwise support a means for deriving the second key based on applying a key derivation function to the at least the portion of the decoded one or more first information blocks. In some examples, message communication component 825 may transmit an indication 837 of the at least the portion of the decoded one or more first information blocks to deriving component 835 and deriving component 835 may transmit an indication 838 of the second key to message communication component 825.

In some examples, to support communicating the first message, the message communication component 825 may be configured as or otherwise support a means for communicating, with the second wireless device, an uplink shared channel transmission or a downlink shared channel transmission that includes the first message.

In some examples, to support communicating the second message, the message communication component 825 may be configured as or otherwise support a means for communicating, with the second wireless device, an uplink control channel transmission or a downlink control channel transmission that includes the second message.

In some examples, the at least the portion of the decoded one or more first information blocks includes at least a portion of one or more code blocks, one or more code block groups, one or more transport blocks, a first set of bits associated with one or more resource elements, a second set of bits associated with one or more resource block groups, or any combination thereof.

In some examples, each of the one or more first information blocks is associated with a component carrier index, a bandwidth part, a configured grant index, a semi-persistently scheduling index, or any combination thereof.

In some examples, the information includes control information or one or more second information blocks.

Additionally, or alternatively, the communications manager 820 may support wireless communication at first wireless device in accordance with examples as disclosed herein. In some examples, the message communication component 825 may be configured as or otherwise support a means for transmitting, to a second wireless device, a first message, the first message including one or more first information blocks encoded based on a first key. For instance, the message communication component may transmit an indication 827 of the first message. The decoding indication component 830 may be configured as or otherwise support a means for receiving, from the second wireless device, an indication 832 that the one or more first information blocks have been successfully decoded. In some examples, decoding indication component 830 may transmit an indication 834 that the one or more first information blocks have been successfully decoded to message communication component 825. In some examples, the message communication component 825 may be configured as or otherwise support a means for communicating, with the second wireless device, a second message, where the second message includes information that is encoded based on a second key that is derived from at least a portion of the one or more decoded first information blocks.

In some examples, the message communication component 825 may be configured as or otherwise support a means for receiving, from the second wireless device, a third message, the third message including one or more second information blocks encoded based on a third key, where the third key is derived from at least a portion of the one or more second information blocks. For instance, message communication component 825 may receive an indication 826 of the third message.

In some examples, the control signaling component 840 may be configured as or otherwise support a means for communicating, with the second wireless device, control signaling indicating the at least the portion of the decoded one or more first information blocks from which the second key is derived.

In some examples, to support communicating the control signaling indicating the at least the portion, the control signaling component 840 may be configured as or otherwise support a means for communicating, with the second wireless device, the control signaling indicating a set of patterns for deriving keys from information blocks.

In some examples, the control signaling component 840 may be configured as or otherwise support a means for communicating, with the second wireless device, second control signaling indicating to select one of the set of patterns for deriving the second key from the one or more first information blocks, where the control signaling includes radio resource control signaling and the second control signaling includes medium access control (MAC) control element signaling.

In some examples, the request component 845 may be configured as or otherwise support a means for communicating, after communicating the first message, radio resource control signaling, medium access control (MAC) control element signaling, downlink control information, or a downlink shared channel transmission including a request to derive the second key from the at least the portion of the decoded one or more first information blocks, where communicating the second message is based on communicating the request.

In some examples, the request includes an indication of a type of channel associated with the one or more first information blocks.

In some examples, the start time indication component 850 may be configured as or otherwise support a means for communicating, with the second wireless device, an indication of a start time for using the second key to encode the information, where communicating the second message is based on communicating the indication of the start time.

In some examples, to support communicating the indication of the start time, the start time indication component 850 may be configured as or otherwise support a means for communicating, with the second wireless device, a first buffering time capability for a downlink shared channel transmission, a second buffering time capability for an uplink shared channel transmission, or any combination thereof.

In some examples, the deriving component 835 may be configured as or otherwise support a means for deriving the second key based on applying a key derivation function to with the at least the portion of the decoded one or more first information blocks.

In some examples, to support communicating the first message, the message communication component 825 may be configured as or otherwise support a means for communicating, with the second wireless device, an uplink shared channel transmission or a downlink shared channel transmission that includes the first message.

In some examples, to support communicating the second message, the message communication component 825 may be configured as or otherwise support a means for communicating, with the second wireless device, an uplink control channel transmission or a downlink control channel transmission that includes the second message.

In some examples, the at least the portion of the decoded one or more first information blocks includes at least a portion of one or more code blocks, one or more code block groups, one or more transport blocks, a first set of bits associated with one or more resource elements, a second set of bits associated with one or more resource block groups, or any combination thereof.

In some examples, each of the one or more first information blocks is associated with a component carrier index, a bandwidth part, a configured grant index, a semi-persistently scheduling index, or any combination thereof.

In some examples, the information includes control information or one or more second information blocks.

Figure 9:
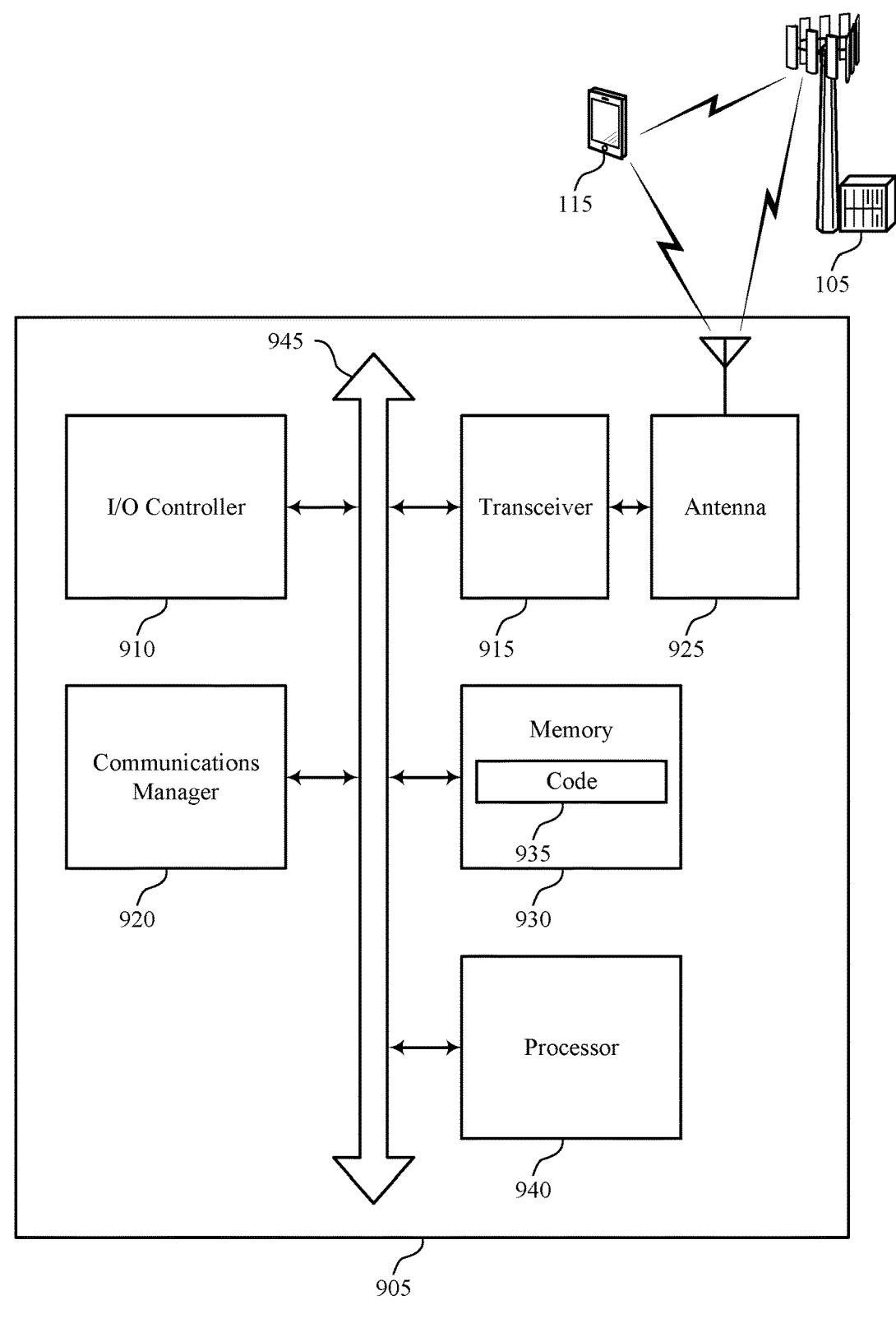
FIG. 9 shows a diagram of a system including a device that supports security key derivation using decoded information blocks in accordance with aspects of the present disclosure.

FIG. 9 shows a diagram of a system 900 including a device 905 that supports security key derivation using decoded information blocks in accordance with aspects of the present disclosure. The device 905 may be an example of or include the components of a device 605, a device 705, a UE 115, or a base station 105 as described herein. The device 905 may communicate wirelessly with one or more base stations 105, UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally, or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting security key derivation using decoded information blocks). For example, the device 905 or a component of the device 905 may include a processor 940 and memory 930 coupled with or to the processor 940, the processor 940 and memory 930 configured to perform various functions described herein.

Additionally, or alternatively, the communications manager 920 may support wireless communication at a first wireless device in accordance with examples as disclosed herein. For example, the communications manager 920 may be configured as or otherwise support a means for receiving, from a second wireless device, a first message, the first message including one or more first information blocks encoded based on a first key, where the one or more first information blocks are associated with an application of the first wireless device. The communications manager 920 may be configured as or otherwise support a means for transmitting, to the second wireless device, an indication that the one or more first information blocks have been successfully decoded. The communications manager 820 may be configured as or support a means for passing the decoded one or more first information blocks to the application. The communications manager 920 may be configured as or otherwise support a means for communicating, with the second wireless device, a second message, where the second message includes information that is encoded based on a second key that is derived from at least a portion of the decoded one or more first information blocks.

Additionally, or alternatively, the communications manager 920 may support wireless communication at first wireless device in accordance with examples as disclosed herein. For example, the communications manager 920 may be configured as or otherwise support a means for transmitting, to a second wireless device, a first message, the first message including one or more first information blocks encoded based on a first key. The communications manager 920 may be configured as or otherwise support a means for receiving, from the second wireless device, an indication that the one or more first information blocks have been successfully decoded, where the one or more decoded information blocks are associated with an application of the second wireless device. The communications manager 920 may be configured as or otherwise support a means for communicating, with the second wireless device, a second message, where the second message includes information that is encoded based on a second key that is derived from at least a portion of the one or more decoded first information blocks.

By including or configuring the communications manager 920 in accordance with examples as described herein, the device 905 may support techniques for reducing overhead when communicating a value of a key between the device 805 and another wireless device.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of security key derivation using decoded information blocks as described herein, or the processor 940 and the memory 930 may be otherwise configured to perform or support such operations.

FIG. 10 shows a flowchart illustrating a method 1000 that supports security key derivation using decoded information blocks in accordance with aspects of the present disclosure. The operations of the method 1000 may be implemented by a wireless device (e.g., a UE or a base station) or its components as described herein. For example, the operations of the method 1000 may be performed by a wireless device as described with reference to FIGS. 1 through 9. In some examples, a wireless device may execute a set of instructions to control the functional elements of the wireless device to perform the described functions. Additionally, or alternatively, the wireless device may perform aspects of the described functions using special-purpose hardware.

At 1005, the method may include receiving, from a second wireless device, a first message, the first message including one or more first information blocks encoded based on a first key, where the one or more first information blocks are associated with an application of the first wireless device. Receiving the first message may include identifying time-frequency resources over which the first message is to be received and receiving the first message over the time-frequency resources. The operations of 1005 may be performed in accordance with examples as disclosed herein. In some examples, aspects of the operations of 1005 may be performed by a message communication component 825 as described with reference to FIG. 8.

At 1010, the method may include transmitting, to the second wireless device, an indication that the one or more first information blocks have been successfully decoded. Transmitting the indication may include identifying time-frequency resources over which the indication is to be transmitted and transmitting the indication over the time-frequency resources. The operations of 1010 may be performed in accordance with examples as disclosed herein. In some examples, aspects of the operations of 1010 may be performed by a decoding indication component 830 as described with reference to FIG. 8.

At 1015, the method may include passing the decoded one or more first information blocks to the application. Passing the decoded one or more first information blocks to the application may include decoding the one or more first information blocks and providing the decoded one or more first information blocks to the application. The operations of 1015 may be performed in accordance with examples as disclosed herein. In some examples, aspects of the operations of 1015 may be performed by a decoding indication component 830 as described with reference to FIG. 8.

At 1020, the method may include communicating, with the second wireless device, a second message, where the second message includes information that is encoded based on a second key that is derived from at least a portion of the decoded one or more first information blocks. Communicating the second message may include identifying time-frequency resources over which the second message is to be communicated and communicating the second message over the time-frequency resources. The operations of 1020 may be performed in accordance with examples as disclosed herein. In some examples, aspects of the operations of 1020 may be performed by a message communication component 825 as described with reference to FIG. 8.

FIG. 11 shows a flowchart illustrating a method 1100 that supports security key derivation using decoded information blocks in accordance with aspects of the present disclosure. The operations of the method 1100 may be implemented by a wireless device (e.g., a UE or a base station) or its components as described herein. For example, the operations of the method 1100 may be performed by a wireless device as described with reference to FIGS. 1 through 9. In some examples, a wireless device may execute a set of instructions to control the functional elements of the wireless device to perform the described functions. Additionally, or alternatively, the wireless device may perform aspects of the described functions using special-purpose hardware.

At 1105, the method may include receiving, from a second wireless device, a first message, the first message including one or more first information blocks encoded based on a first key, where the one or more first information blocks are associated with an application of the first wireless device. Receiving the first message may include identifying time-frequency resources over which the first message is to be received and receiving the first message over the time-frequency resources. The operations of 1105 may be performed in accordance with examples as disclosed herein. In some examples, aspects of the operations of 1105 may be performed by a message communication component 825 as described with reference to FIG. 8.

At 1110, the method may include transmitting, to the second wireless device, an indication that the one or more first information blocks have been successfully decoded. Transmitting the indication may include identifying time-frequency resources over which the indication is to be transmitted and transmitting the indication over the time-frequency resources. The operations of 1110 may be performed in accordance with examples as disclosed herein. In some examples, aspects of the operations of 1110 may be performed by a decoding indication component 830 as described with reference to FIG. 8.

At 1115, the method may include passing the decoded one or more first information blocks to the application. Passing the decoded one or more first information blocks to the application may include decoding the one or more first information blocks and providing the decoded one or more first information blocks to the application. The operations of 1115 may be performed in accordance with examples as disclosed herein. In some examples, aspects of the operations of 1115 may be performed by a decoding indication component 830 as described with reference to FIG. 8.

At 1120, the method may include transmitting, to the second wireless device, a third message, the third message including one or more second information blocks encoded based on a third key. Transmitting the third message may include identifying time-frequency resources over which the third message is to be transmitted and transmitting the third message over the time-frequency resources. The operations of 1120 may be performed in accordance with examples as disclosed herein. In some examples, aspects of the operations of 1120 may be performed by a message communication component 825 as described with reference to FIG. 8.

At 1125, the method may include communicating, with the second wireless device, a second message, where the second message includes information that is encoded based on a second key that is derived from at least a portion of the decoded one or more first information blocks and at least a portion of the one or more second information blocks. Communicating the second message may include identifying time-frequency resources over which the second message is to be communicated and communicating the second message over the time-frequency resources. The operations of 1125 may be performed in accordance with examples as disclosed herein. In some examples, aspects of the operations of 1125 may be performed by a message communication component 825 as described with reference to FIG. 8.

FIG. 12 shows a flowchart illustrating a method 1200 that supports security key derivation using decoded information blocks in accordance with aspects of the present disclosure. The operations of the method 1200 may be implemented by a wireless device (e.g., a UE or a base station) or its components as described herein. For example, the operations of the method 1200 may be performed by a wireless device as described with reference to FIGS. 1 through 9. In some examples, a wireless device may execute a set of instructions to control the functional elements of the wireless device to perform the described functions. Additionally, or alternatively, the wireless device may perform aspects of the described functions using special-purpose hardware.

At 1205, the method may include transmitting, to a second wireless device, a first message, the first message including one or more first information blocks encoded based on a first key. Transmitting the first message may include identifying time-frequency resources over which the first message is to be transmitted and transmitting the first message over the time-frequency resources. The operations of 1205 may be performed in accordance with examples as disclosed herein. In some examples, aspects of the operations of 1205 may be performed by a message communication component 825 as described with reference to FIG. 8.

At 1210, the method may include receiving, from the second wireless device, an indication that the one or more first information blocks have been successfully decoded, where the one or more decoded information blocks are associated with an application of the second wireless device. Receiving the indication may include identifying time-frequency resources over which the indication is to be received and receiving the indication over the time-frequency resources. The operations of 1210 may be performed in accordance with examples as disclosed herein. In some examples, aspects of the operations of 1210 may be performed by a decoding indication component 830 as described with reference to FIG. 8.

At 1215, the method may include communicating, with the second wireless device, a second message, where the second message includes information that is encoded based on a second key that is derived from at least a portion of the one or more decoded first information blocks. Communicating the second message may include identifying time-frequency resources over which the second message is to be communicated and communicating the second message over the time-frequency resources. The operations of 1215 may be performed in accordance with examples as disclosed herein. In some examples, aspects of the operations of 1215 may be performed by a message communication component 825 as described with reference to FIG. 8.

Figure 13:
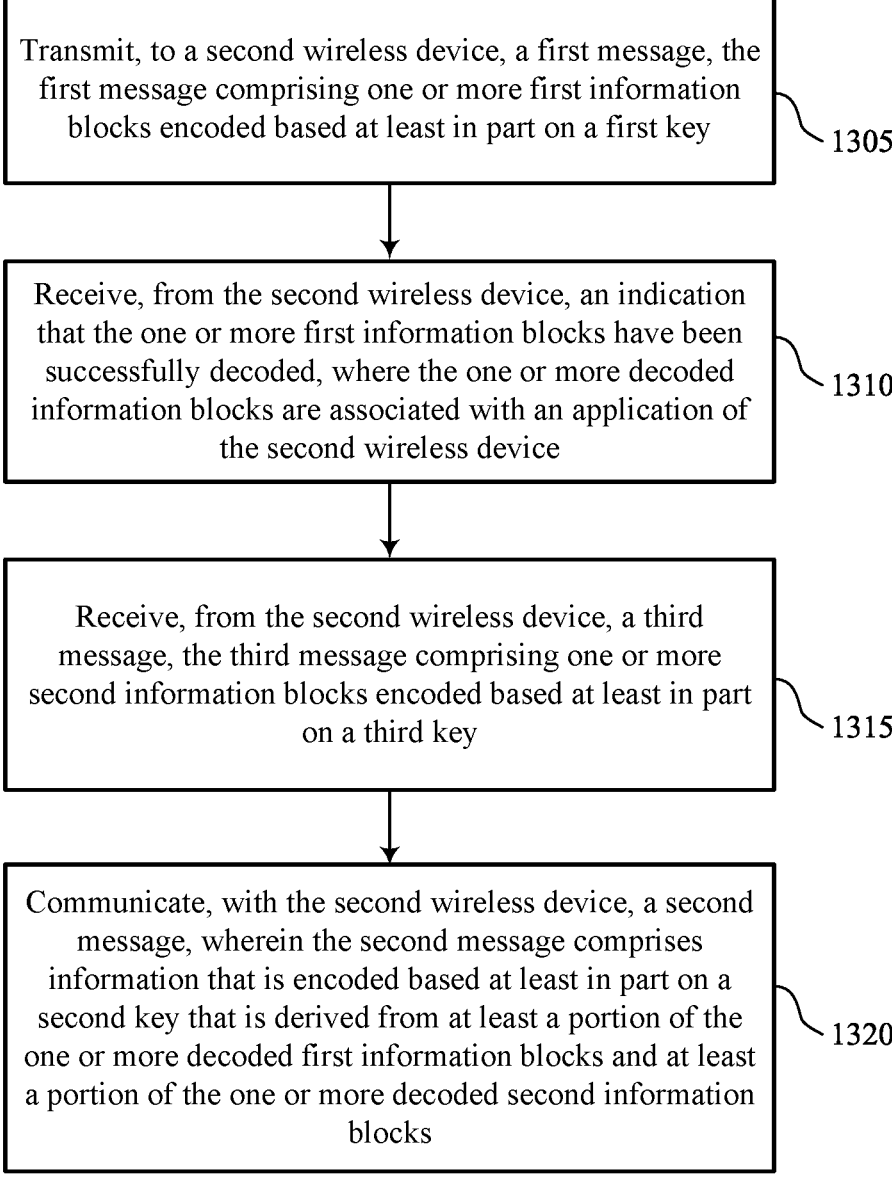

FIG. 13 shows a flowchart illustrating a method 1300 that supports security key derivation using decoded information blocks in accordance with aspects of the present disclosure. The operations of the method 1300 may be implemented by a wireless device (e.g., a UE or a base station) or its components as described herein. For example, the operations of the method 1300 may be performed by a wireless device as described with reference to FIGS. 1 through 9. In some examples, a wireless device may execute a set of instructions to control the functional elements of the wireless device to perform the described functions. Additionally, or alternatively, the wireless device may perform aspects of the described functions using special-purpose hardware.

At 1305, the method may include transmitting, to a second wireless device, a first message, the first message including one or more first information blocks encoded based on a first key. Transmitting the first message may include identifying time-frequency resources over which the first message is to be transmitted and transmitting the first message over the time-frequency resources. The operations of 1305 may be performed in accordance with examples as disclosed herein. In some examples, aspects of the operations of 1305 may be performed by a message communication component 825 as described with reference to FIG. 8.

At 1310, the method may include receiving, from the second wireless device, an indication that the one or more first information blocks have been successfully decoded, where the one or more decoded information blocks are associated with an application of the second wireless device. Receiving the indication may include identifying time-frequency resources over which the indication is to be received and receiving the indication over the time-frequency resources. The operations of 1310 may be performed in accordance with examples as disclosed herein. In some examples, aspects of the operations of 1310 may be performed by a decoding indication component 830 as described with reference to FIG. 8.

At 1315, the method may include receiving, from the second wireless device, a third message, the third message including one or more second information blocks encoded based on a third key. Receiving the third message may include identifying time-frequency resources over which the third message is to be received and receiving the third message over the time-frequency resources. The operations of 1315 may be performed in accordance with examples as disclosed herein. In some examples, aspects of the operations of 1315 may be performed by a message communication component 825 as described with reference to FIG. 8.

At 1320, the method may include communicating, with the second wireless device, a second message, where the second message includes information that is encoded based on a second key that is derived from at least a portion of the one or more decoded first information blocks and at least a portion of the one or more decoded second information blocks. Communicating the second message may include identifying time-frequency resources over which the second message is to be communicated and communicating the second message over the time-frequency resources. The operations of 1320 may be performed in accordance with examples as disclosed herein. In some examples, aspects of the operations of 1320 may be performed by a message communication component 825 as described with reference to FIG. 8.

FIG. 14 shows a flowchart illustrating a method 1400 that supports security key derivation using decoded information blocks in accordance with aspects of the present disclosure. The operations of the method 1400 may be implemented by a wireless device (e.g., a UE or a base station) or its components as described herein. For example, the operations of the method 1400 may be performed by a wireless device as described with reference to FIGS. 1 through 9. In some examples, a wireless device may execute a set of instructions to control the functional elements of the wireless device to perform the described functions. Additionally, or alternatively, the wireless device may perform aspects of the described functions using special-purpose hardware.

At 1405, the method may include communicating, with a second wireless device, a first message, the first message comprising one or more first information blocks. Communicating the first message may include identifying time-frequency resources over which the first message is to be communicated and communicating the first message over the time-frequency resources. The operations of 1405 may be performed in accordance with examples as disclosed herein. In some examples, aspects of the operations of 1405 may be performed by a message communication component 825 as described with reference to FIG. 8.

At 1410, the method may include communicating, with the second wireless device, an indication that the one or more first information blocks have been successfully decoded. Communicating the indication may include identifying time-frequency resources over which the indication is to be communicated and communicating the indication over the time-frequency resources. The operations of 1410 may be performed in accordance with examples as disclosed herein. In some examples, aspects of the operations of 1410 may be performed by a decoding indication component 830 as described with reference to FIG. 8.

At 1415, the method may include communicating, with the second wireless device, a second message, wherein the second message comprises information that is encoded based at least in part on a key that is derived from at least a portion of the decoded one or more first information blocks. Communicating the second message may include identifying time-frequency resources over which the second message is to be communicated and communicating the second message over the time-frequency resources. The operations of 1415 may be performed in accordance with examples as disclosed herein. In some examples, aspects of the operations of 1415 may be performed by a message communication component 825 as described with reference to FIG. 8.

The following provides an overview of aspects of the present disclosure:

Aspect 1: A method, comprising: receiving, from a second wireless device, a first message, the first message comprising one or more first information blocks encoded based at least in part on a first key, wherein the one or more first information blocks are associated with an application of the first wireless device; transmitting, to the second wireless device, an indication that the one or more first information blocks have been successfully decoded; passing the decoded one or more first information blocks to the application; and communicating, with the second wireless device, a second message, wherein the second message comprises information that is encoded based at least in part on a second key that is derived from at least a portion of the decoded one or more first information blocks.

Aspect 2: The method of aspect 1, further comprising: transmitting, to the second wireless device, a third message, the third message comprising one or more second information blocks encoded based at least in part on a third key, wherein the third key is derived from at least a portion of the one or more second information blocks.

Aspect 3: The method of any of aspects 1 through 2, further comprising: communicating, with the second wireless device, control signaling indicating the at least the portion of the decoded one or more first information blocks from which the second key is derived.

Aspect 4: The method of aspect 3, wherein communicating the control signaling indicating the at least the portion of the decoded one or more first information blocks comprises: communicating, with the second wireless device, the control signaling indicating a set of patterns for deriving keys from information blocks.

Aspect 5: The method of aspect 4, further comprising: communicating, with the second wireless device, second control signaling indicating to select one of the set of patterns for deriving the second key from the one or more first information blocks, wherein the control signaling comprises radio resource control signaling and the second control signaling comprises medium access control (MAC) control element signaling.

Aspect 6: The method of any of aspects 1 through 5, further comprising: communicating, after communicating the first message, radio resource control signaling, medium access control (MAC) control element signaling, downlink control information, or a downlink shared channel transmission comprising a request to derive the second key from the at least the portion of the decoded one or more first information blocks, wherein communicating the second message is based at least in part on communicating the request.

Aspect 7: The method of aspect 6, wherein the request comprises an indication of a type of channel associated with the one or more first information blocks.

Aspect 8: The method of any of aspects 1 through 7, further comprising: communicating an indication of a start time for using the second key to encode the information, wherein communicating the second message is based at least in part on communicating the indication of the start time.

Aspect 9: The method of aspect 8, wherein communicating the indication of the start time comprises: communicating, with the second wireless device, a first buffering time capability for a downlink shared channel transmission, a second buffering time capability for an uplink shared channel transmission, or any combination thereof.

Aspect 10: The method of any of aspects 1 through 9, wherein communicating the first message comprises: communicating, with the second wireless device, an uplink shared channel transmission or a downlink shared channel transmission that comprises the first message.

Aspect 11: The method of any of aspects 1 through 10, wherein communicating the second message comprises: communicating, with the second wireless device, an uplink control channel transmission or a downlink control channel transmission that comprises the second message.

Aspect 12: The method of any of aspects 1 through 11, wherein the at least the portion of the decoded one or more first information blocks comprises at least a portion of one or more code blocks, one or more code block groups, one or more transport blocks, a first set of bits associated with one or more resource elements, a second set of bits associated with one or more resource block groups, or any combination thereof.

Aspect 13: The method of any of aspects 1 through 12, wherein the first wireless device comprises one of a UE or a base station, and the second wireless device comprises the other of the UE or the base station.

Aspect 14: The method of any of aspects 1 through 13, wherein the information comprises control information or one or more second information blocks.

Aspect 15: A method, comprising: transmitting, to a second wireless device, a first message, the first message comprising one or more first information blocks encoded based at least in part on a first key; receiving, from the second wireless device, an indication that the one or more first information blocks have been successfully decoded, wherein the one or more decoded information blocks are associated with an application of the second wireless device; and communicating, with the second wireless device, a second message, wherein the second message comprises information that is encoded based at least in part on a second key that is derived from at least a portion of the one or more decoded first information blocks.

Aspect 16: The method of aspect 15, further comprising: receiving, from the second wireless device, a third message, the third message comprising one or more second information blocks encoded based at least in part on a third key, wherein the third key is derived from at least a portion of the one or more second information blocks.

Aspect 17: The method of any of aspects 15 through 16, further comprising: communicating, with the second wireless device, control signaling indicating the at least the portion of the decoded one or more first information blocks from which the second key is derived Aspect 18: The method of aspect 17, wherein communicating the control signaling indicating the at least the portion comprises: communicating, with the second wireless device, the control signaling indicating a set of patterns for deriving keys from information blocks.

Aspect 19: The method of aspect 18, further comprising: communicating, with the second wireless device, second control signaling indicating to select one of the set of patterns for deriving the second key from the one or more first information blocks, wherein the control signaling comprises radio resource control signaling and the second control signaling comprises medium access control (MAC) control element signaling.

Aspect 20: The method of any of aspects 15 through 19, further comprising: communicating, after communicating the first message, radio resource control signaling, medium access control (MAC) control element signaling, downlink control information, or a downlink shared channel transmission comprising a request to derive the second key from the at least the portion of the decoded one or more first information blocks, wherein communicating the second message is based at least in part on communicating the request.

Aspect 21: The method of aspect 20, wherein the request comprises an indication of a type of channel associated with the one or more first information blocks.

Aspect 22: The method of any of aspects 15 through 21, further comprising: communicating, with the second wireless device, an indication of a start time for using the second key to encode the information, wherein communicating the second message is based at least in part on communicating the indication of the start time.

Aspect 23: The method of aspect 22, wherein communicating the indication of the start time comprises: communicating, with the second wireless device, a first buffering time capability for a downlink shared channel transmission, a second buffering time capability for an uplink shared channel transmission, or any combination thereof.

Aspect 24: The method of any of aspects 15 through 23, wherein communicating the first message comprises: communicating, with the second wireless device, an uplink shared channel transmission or a downlink shared channel transmission that comprises the first message.

Aspect 25: The method of any of aspects 15 through 24, wherein communicating the second message comprises: communicating, with the second wireless device, an uplink control channel transmission or a downlink control channel transmission that comprises the second message.

Aspect 26: The method of any of aspects 15 through 25, wherein the at least the portion of the decoded one or more first information blocks comprises at least a portion of one or more code blocks, one or more code block groups, one or more transport blocks, a first set of bits associated with one or more resource elements, a second set of bits associated with one or more resource block groups, or any combination thereof.

Aspect 27: The method of any of aspects 15 through 26, wherein the first wireless device comprises one of a UE or a base station, and the second wireless device comprises the other of the UE or the base station.

Aspect 28: The method of any of aspects 15 through 27, wherein the information comprises control information or one or more second information blocks Aspect 29: An apparatus comprising a processor; memory coupled with the processor; and instructions stored in the memory and executable by the processor to cause the apparatus to perform a method of any of aspects 1 through 14.

Aspect 30: An apparatus comprising at least one means for performing a method of any of aspects 1 through 14.

Aspect 31: A non-transitory computer-readable medium storing code the code comprising instructions executable by a processor to perform a method of any of aspects 1 through 14.

Aspect 32: An apparatus comprising a processor; memory coupled with the processor; and instructions stored in the memory and executable by the processor to cause the apparatus to perform a method of any of aspects 15 through 28.

Aspect 33: An apparatus comprising at least one means for performing a method of any of aspects 15 through 28.

Aspect 34: A non-transitory computer-readable medium storing code the code comprising instructions executable by a processor to perform a method of any of aspects 15 through 28.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a first wireless device, comprising:
   a processor;
   memory coupled with the processor; and
   instructions stored in the memory and executable by the processor to cause the apparatus to:
      receive, from a second wireless device via an uplink shared channel or a downlink shared channel, a first message, the first message comprising one or more first information blocks encoded based at least in part on a first key, wherein the one or more first information blocks are associated with an application of the first wireless device;
      transmit, to the second wireless device, an indication that the one or more first information blocks have been successfully decoded;
      pass the decoded one or more first information blocks to the application; and
      communicate, with the second wireless device via an uplink control channel or a downlink control channel, a second message, wherein the second message comprises information that is encoded based at least in part on a second key that is derived from at least a portion of the decoded one or more first information blocks.

2. The apparatus of claim 1, wherein the instructions are further executable by the processor to cause the apparatus to:
   transmit, to the second wireless device, a third message, the third message comprising one or more second information blocks encoded based at least in part on a third key, wherein the third key is derived from at least a portion of the one or more second information blocks.

3. The apparatus of claim 1, wherein the instructions are further executable by the processor to cause the apparatus to:
   communicate, with the second wireless device, control signaling indicating the at least the portion of the decoded one or more first information blocks from which the second key is derived.

4. The apparatus of claim 3, wherein the instructions to communicate the control signaling indicating the at least the portion of the decoded one or more first information blocks are executable by the processor to cause the apparatus to:

communicate, with the second wireless device, the control signaling indicating a set of patterns for deriving keys from information blocks.

5. The apparatus of claim 4, wherein the instructions are further executable by the processor to cause the apparatus to:

communicate, with the second wireless device, second control signaling indicating to select one of the set of patterns for deriving the second key from the one or more first information blocks, wherein the control signaling comprises radio resource control signaling and the second control signaling comprises medium access control (MAC) control element signaling.

6. The apparatus of claim 1, wherein the instructions are further executable by the processor to cause the apparatus to:

communicate, after communicating the first message, radio resource control signaling, medium access control (MAC) control element signaling, downlink control information, or a downlink shared channel transmission comprising a request to derive the second key from the at least the portion of the decoded one or more first information blocks, wherein communicating the second message is based at least in part on communicating the request.

7. The apparatus of claim 6, wherein the request comprises an indication of a type of channel associated with the one or more first information blocks.

8. The apparatus of claim 1, wherein the instructions are further executable by the processor to cause the apparatus to:

communicate an indication of a start time for using the second key to encode the information, wherein communicating the second message is based at least in part on communicating the indication of the start time.

9. The apparatus of claim 8, wherein the instructions to communicate the indication of the start time are executable by the processor to cause the apparatus to:

communicate, with the second wireless device, a first buffering time capability for a downlink shared channel transmission, a second buffering time capability for an uplink shared channel transmission, or any combination thereof.

10. The apparatus of claim 1, wherein the instructions to communicate the first message are executable by the processor to cause the apparatus to:

communicate, with the second wireless device, an uplink shared channel transmission or a downlink shared channel transmission that comprises the first message.

11. The apparatus of claim 1, wherein the instructions to communicate the second message are executable by the processor to cause the apparatus to:

communicate, with the second wireless device, an uplink control channel transmission or a downlink control channel transmission that comprises the second message.

12. The apparatus of claim 1, wherein the at least the portion of the decoded one or more first information blocks comprises at least a portion of one or more code blocks, one or more code block groups, one or more transport blocks, a first set of bits associated with one or more resource elements, a second set of bits associated with one or more resource block groups, or any combination thereof.

13. The apparatus of claim 1, wherein the first wireless device comprises one of a user equipment (UE) or a base station, and the second wireless device comprises the other of the UE or the base station.

14. The apparatus of claim 1, wherein:

the information comprises control information or one or more second information blocks.

15. An apparatus for wireless communication at first wireless device, comprising:

a processor;

memory coupled with the processor; and instructions stored in the memory and executable by the processor to cause the apparatus to:

transmit, to a second wireless device via an uplink shared channel or a downlink shared channel, a first message, the first message comprising one or more first information blocks encoded based at least in part on a first key;

receive, from the second wireless device, an indication that the one or more first information blocks have been successfully decoded, wherein the one or more decoded information blocks are associated with an application of the second wireless device; and communicate, with the second wireless device via an uplink control channel or a downlink control channel, a second message, wherein the second message comprises information that is encoded based at least in part on a second key that is derived from at least a portion of the one or more decoded first information blocks.

16. The apparatus of claim 15, wherein the instructions are further executable by the processor to cause the apparatus to:

receive, from the second wireless device, a third message, the third message comprising one or more second information blocks encoded based at least in part on a third key, wherein the third key is derived from at least a portion of the one or more second information blocks.

17. The apparatus of claim 15, wherein the instructions are further executable by the processor to cause the apparatus to:

communicate, with the second wireless device, control signaling indicating the at least the portion of the decoded one or more first information blocks from which the second key is derived.

18. The apparatus of claim 17, wherein the instructions to communicate the control signaling indicating the at least the portion are executable by the processor to cause the apparatus to:

communicate, with the second wireless device, the control signaling indicating a set of patterns for deriving keys from information blocks.

19. The apparatus of claim 18, wherein the instructions are further executable by the processor to cause the apparatus to:

communicate, with the second wireless device, second control signaling indicating to select one of the set of patterns for deriving the second key from the one or more first information blocks, wherein the control signaling comprises radio resource control signaling and the second control signaling comprises medium access control (MAC) control element signaling.

20. The apparatus of claim 15, wherein the instructions are further executable by the processor to cause the apparatus to:

communicate, after communicating the first message, radio resource control signaling, medium access control (MAC) control element signaling, downlink control information, or a downlink shared channel transmission comprising a request to derive the second key from the at least the portion of the decoded one or more first information blocks, wherein communicating the second message is based at least in part on communicating the request.

21. The apparatus of claim 20, wherein the request comprises an indication of a type of channel associated with the one or more first information blocks.

22. The apparatus of claim 15, wherein the instructions are further executable by the processor to cause the apparatus to:

communicate, with the second wireless device, an indication of a start time for using the second key to encode the information, wherein communicating the second message is based at least in part on communicating the indication of the start time.

23. The apparatus of claim 22, wherein the instructions to communicate the indication of the start time are executable by the processor to cause the apparatus to:

communicate, with the second wireless device, a first buffering time capability for a downlink shared channel transmission, a second buffering time capability for an uplink shared channel transmission, or any combination thereof.

24. The apparatus of claim 15, wherein the instructions to communicate the first message are executable by the processor to cause the apparatus to:

communicate, with the second wireless device, an uplink shared channel transmission or a downlink shared channel transmission that comprises the first message.

25. The apparatus of claim 15, wherein the instructions to communicate the second message are executable by the processor to cause the apparatus to:

communicate, with the second wireless device, an uplink control channel transmission or a downlink control channel transmission that comprises the second message.

26. The apparatus of claim 15, wherein the at least the portion of the decoded one or more first information blocks comprises at least a portion of one or more code blocks, one or more code block groups, one or more transport blocks, a first set of bits associated with one or more resource elements, a second set of bits associated with one or more resource block groups, or any combination thereof.

27. The apparatus of claim 15, wherein the first wireless device comprises one of a user equipment (UE) or a base station, and the second wireless device comprises the other of the UE or the base station.

28. The apparatus of claim 15, wherein:

the information comprises control information or one or more second information blocks.

29. A method for wireless communication at a first wireless device, comprising:

receiving, from a second wireless device via an uplink shared channel or a downlink shared channel, a first message, the first message comprising one or more first information blocks encoded based at least in part on a first key, wherein the one or more first information blocks are associated with an application of the first wireless device;

transmitting, to the second wireless device, an indication that the one or more first information blocks have been successfully decoded;

passing the decoded one or more first information blocks to the application; and communicating, with the second wireless device, a second message via an uplink control channel or a downlink control channel, wherein the second message comprises information that is encoded based at least in part on a second key that is derived from at least a portion of the decoded one or more first information blocks.

30. A method for wireless communication at first wireless device, comprising:

transmitting, to a second wireless device via an uplink shared channel or a downlink shared channel, a first message, the first message comprising one or more first information blocks encoded based at least in part on a first key;

receiving, from the second wireless device, an indication that the one or more first information blocks have been successfully decoded, wherein the one or more decoded information blocks are associated with an application of the second wireless device; and communicating, with the second wireless device via an uplink control channel or a downlink control channel, a second message, wherein the second message comprises information that is encoded based at least in part on a second key that is derived from at least a portion of the one or more decoded first information blocks.

* * * * *